US010222396B2

(12) United States Patent
Iv Evangelista et al.

(10) Patent No.: US 10,222,396 B2
(45) Date of Patent: Mar. 5, 2019

(54) METHOD OF AND DEVICE FOR DETECTING AND VISUALLY REPRESENTING AN IMPACT EVENT

(71) Applicant: Samsung Electronics Co., Ltd., Suwon-si, Gyeonggi-do (KR)

(72) Inventors: Alberto Iv Evangelista, Makati (PH); Jose Mari Esguerra, Quezon (PH); Kyle Benedict Sy, Quezon (PH); Patrich Paolo Datu, Valenzuela (PH); Kohleen Fortuno, Manila (PH); Joe-mar Chavez, Pasig (PH); Joseph Paulo Los Banos, Antipolo (PH)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/443,310

(22) Filed: Feb. 27, 2017

(65) Prior Publication Data

US 2017/0372585 A1    Dec. 28, 2017

(30) Foreign Application Priority Data

Jun. 24, 2016 (PH) .............................. 1-2016-000237

(51) Int. Cl.
*G01P 15/08* (2006.01)
*G01C 19/00* (2013.01)

(52) U.S. Cl.
CPC .......... *G01P 15/0891* (2013.01); *G01C 19/00* (2013.01)

(58) Field of Classification Search
CPC .... G08B 21/18; G01P 15/0891; G01P 15/001
See application file for complete search history.

(56) References Cited

U.S. PATENT DOCUMENTS

| 5,834,626 A | 11/1998 | De Castro et al. |
| 6,212,026 B1 * | 4/2001 | Ohmi ................ G11B 19/04 360/60 |

(Continued)

FOREIGN PATENT DOCUMENTS

| KR | 2002-0064419 A | 8/2002 |
| KR | 10-2006-0057401 A | 5/2006 |

OTHER PUBLICATIONS

Carana, Forecast: America to Be Hit By Temperatures As Low As Minus 40 Degrees, Arctic News, Jan. 30, 2014, http://arctic-news.blogspot.kr/2014/01/forecast-america-to-be-hit-by-temperatures-as-low-as-minus-40-degrees.html.

*Primary Examiner* — Kabir A Timory
(74) *Attorney, Agent, or Firm* — Jefferson IP Law, LLP

(57) ABSTRACT

An electronic device for visually representing an impact event is provided. The electronic device includes an accelerometer, a gyroscope, and a magnetometer for measuring its acceleration, angular rotation, and magnetic field intensity relative to its motion. Using any suitable filter, a normalization process is used to standardize readings from the accelerometer, gyroscope, and magnetometer. The electronic device also includes impact location and impact severity determination procedures executable by its processor from its memory module to provide an impact indicator or a visual representation of the impact which may indicate possible damage, shock or fracture incurred on the device. The impact indicator serves as a preview of impacts by displaying gradients of green, yellow and red depicted in increasing severity, i.e., from "no impact" event to "severe impact" event.

18 Claims, 26 Drawing Sheets

(56) References Cited

U.S. PATENT DOCUMENTS

| | | | | |
|---|---|---|---|---|
| 2011/0096482 A1* | 4/2011 | Yano | ............... | H04M 1/185 |
| | | | | 361/679.01 |
| 2013/0257582 A1* | 10/2013 | Rothkopf | ............ | G06F 1/1656 |
| | | | | 340/3.1 |
| 2016/0054354 A1 | 2/2016 | Keal et al. | | |

* cited by examiner

METHOD OF AND DEVICE FOR DETECTING AND VISUALLY REPRESENTING AN IMPACT EVENT

CROSS-REFERENCE TO RELATED APPLICATION(S)

This application claims the benefit under 35 U.S.C. § 119(a) of a Philippines patent application filed on Jun. 24, 2016 in the Philippines Intellectual Property Office and assigned Serial number 1-2016-000237, the entire disclosure of which is hereby incorporated by reference.

TECHNICAL FIELD

The present disclosure relates to an impact event detection method and device. More particularly, the present disclosure relates to although not exclusively, the impact event detection method and device are arranged to visually represent an impact event on both accessible and inaccessible parts in the framework of portable electronic devices such as handheld mobile phones, tablet computers, cameras, multimedia players, and the like.

BACKGROUND

Electronic devices, especially the handheld or portable type such as mobile phones, tablet computers, cameras, multimedia players, and the like, are often damaged when they fall or hit hard surfaces. Catching a handheld mobile phone in a flight, for example, usually requires endogenous attention. In such a case, unavoidable momentary lapses in attention can lead to an accidentally dropped mobile phone hitting the ground or other peripheral structures such as walls, tables, chairs, and furniture. Parts malfunctioning, operating system failure, faulty electrical connection and, in severe cases, memory corruption are some of the consequences that a dropped mobile phone may suffer.

When certain forms of damage such as dents and scratches occur on an externally accessible part of the mobile phone, one may be able to detect the location and, at times, even severity of the damage by conducting a simple visual inspection. Results of this visual inspection may be used by device manufacturer service centers as diagnostic information, or by device manufacturer research and development units as input for developing product designs and/or manufacturing processes which minimize damage to electronic devices when they are subjected to impact conditions. However, not every part of an electronic device is externally accessible. Some internal parts of an electronic device are not removable because they are either embedded in the device itself, or laminated, or tempered. Hence, they are not readily accessible for visual inspection by a human inspector. In this regard, it is desirable to detect an impact event on both accessible and inaccessible parts in the framework of electronic devices.

United States Patent Publication No. 20160054354 published on Feb. 25, 2016 to Invensense, Inc. (USA) describes a drop detection system for reliably detecting when an electronic device has been dropped. The drop detection system includes at least one module that is operable to, at least: (i) perform fall detection; (ii) perform impact detection; (iii) perform no-motion detection; and (iv) perform device drop detection, based at least in part on the fall detection, the impact detection, and the no-motion detection, wherein the module is operable to perform said detection through the use of sensor signals from various sensors which may be attached to internal parts of the device. The sensors may include any one or more of a gyroscope, a compass, a magnetometer, an accelerometer, a microphone, a pressure sensor, a proximity sensor, a moisture sensor, a temperature sensor, a biometric sensor, and an ambient light sensor.

A method associated with the cited prior drop detection system comprises the step of storing information of a detected drop (e.g., time and/or date information, timer/counter values, sensor data, threshold comparison results, impact direction and/or magnitude, fall detection parameters, impact detection parameters, no-motion detection parameters, etc.) in a memory. Such a memory may be a memory of the device (e.g., microprocessor (MPU) or MPU internal and/or external memory). The method further comprises communicating such information to a networked device (e.g., a network server). Information of a detected drop may be stored in a non-volatile memory for later reading and/or communicated to a network server prior to the drop rendering the device inoperable. In such a scenario, time/date information of the drop may be stored and/or communicated for later comparison to a time/date at which a device became inoperable.

While the information associated with a detected drop according to the implementations of the cited prior drop detection system and associated method can be used to aid visual inspection processes at device manufacturer service centers or at device manufacturer research and development units in detecting an impact event on both accessible and inaccessible parts in the framework of electronic devices, the same information have to undergo a mentally tortuous and tedious process of evaluation and interpretation. Even where this time-consuming and laborious process has been dealt with, special tools such as prying tools and magnifiers may be further required to determine the location of the impact on the device and assess the severity of the impact and any potential damage that may arise due to the impact.

There is therefore an outstanding need for method and device arranged to visually represent a monitored impact event such that a concrete evidence of impact which may be indicative of a possible damaged area in and on the device, and detection of such evidence are readily provided without requiring an unnecessary time-consuming and laborious evaluation and/or interpretation process and as well as special inspection tools.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide method of and device for detecting and visually representing an impact event.

In accordance with aspect of the disclosure, an electronic device for detecting and visually representing an impact event which may be monitored is provided. The electronic device includes, (i) a data processor, (ii) a motion sensor system integrated into the device and communicatively coupled to the processor, (iii) a display driver module operatively coupled to the processor, and (iv) a memory module in communication with each of the processor and the motion sensor system. The motion sensor system may include accelerometer sensor for sensing and outputting acceleration signals representative of the motion of the device, a gyroscope sensor for sensing and outputting rotation signals representative of a rotational motion of the device, and a magnetometer for sensing and outputting magnetic field signals representative of a magnetic field of the earth serving as a reference point for the rotation signals outputted by the gyroscope sensor.

The acceleration, rotation, and magnetic field signals corresponding to various motions of the device constitute impact parameter information which are generally used by a processor-executed impact location determination procedure from the memory module to determine an impact vector information and detect whether an impact has occurred based at least in part on a comparison of the determined impact vector information with a threshold impact vector information.

If the impact has occurred, an orientation of the device based on the impact parameter information is determined, and an approximated location of the impact on the device based on the orientation of the device is consequently determined using the impact location determination procedure. The display driver module is caused by the processor to display on a display of the device an impact indicator corresponding to the approximated location of the impact. Severity of the impact is also determined using a processor-executed impact severity determination procedure from the memory module by generating a quantitative metric related to the impact which occurred on the approximated location of the impact on the device, and causing the display driver module to manipulate attributes of the impact indicator based on the generated quantitative metric which may be a count of a number of times that the impact has occurred on the approximated location.

The impact indicator may be a light pattern such as a colored light pattern projected by a light source operatively coupled to the display driver module. The light source may be one or both of a set of light emitting elements and a set of light sensitive elements. Preferably, the colored light pattern projected by any one of the light emitting elements and light sensitive elements is adapted to change in color in response to the quantitative metric generated by the impact severity determination procedure executing on the processor from the memory module, The colored light pattern may include colors representative of gradients of green, yellow and red depicted in increasing severity. For example, the red color may represent a "severe impact" event, the yellow color may represent a "moderate impact" event, and the green color may represent a "no impact" event. The green to red gradient is preferably used to represent low to high degree or severity of impact, i.e., from "no impact" event to "severe impact" event, on various approximated locations of impact on the device. In essence, the impact indicator serves as a preview of impacts.

The provision of displaying the impact indicator on the display of the device, which is indicative of impact location and/or impact severity, readily provides a visual representation of a monitored impact event based on the impact parameter information from the motion sensor system in such a way that there is a concrete evidence of impact and such evidence can be detected without requiring an unnecessary time-consuming and laborious evaluation and/or interpretation process and as well as special inspection tools like prying tools, magnifiers, and the like.

In essence, the disclosure is directed to the generation and display on the display of the device of the impact indicator which also serves as an automated diagram following a color scheme representing the quantitative metric or the number of times that the impact has occurred on the device when it is dropped or hit. This thereby indicates portions of the device that may have been damaged, fractured or underwent shock due to one or more impact events. With one preferred framework utilizing the accelerometer, gyroscope, and magnetometer of the motion sensor system built-in with, or integrated into, the device and comprising the computer-executable decision-making procedures that determine the impact location and as well as the impact severity, the visual representation or translation of the impact parameter information is presented on the display of the device for an easier and faster understanding of the same information.

For device manufacturer service centers, the disclosure can serve as a diagnostic tool to determine malfunctioned device parts. For device manufacturer research and development units, the disclosure can serve as an input in generating concrete evidence of impact which may be utilized for the purpose of assisting them in making products with more durability and protection against any potential damage arising from various impact events on portable and handheld electronic devices such as mobile phones.

For a better understanding of the disclosure and to show how the same may be performed, preferred various embodiments thereof will now be described, by way of non-limiting examples only, with reference to the accompanying drawings.

In accordance with another aspect of the present disclosure, an electronic device for representing an impact event is provided. The electronic device includes at least one processor, at least one sensor communicatively coupled to the at least one processor, and a display operatively coupled to the at least one processor. The at least one sensor is configured to measure at least one physical value corresponding to a movement of the electronic device. The at least one processor is configured to, in response to detecting an impact occurred on the electronic device, determine at least one of a location of the impact on the electronic device or a degree of the impact, based on the at least one physical value. And the display is configured to display the at least one of the location of the impact or the degree of the impact.

In accordance with another aspect of the present disclosure, a method for representing an impact event on an electronic device is provided. The method includes measuring at least one physical value corresponding to a movement of the electronic device, using at least one sensor, in response to detecting an impact occurred on the electronic device, determining at least one of a location of the impact on the electronic device or a degree of the impact, based on the at least one physical value, and displaying the at least one of the location of the impact or the degree of the impact.

In accordance with another aspect of the present disclosure, a non-transitory computer-readable medium comprises computer executable instructions that when executed by a processor of an electronic device cause the processor to effectuate is provided. The method includes measuring at least one physical value corresponding to a movement of the electronic device, using at least one sensor, in response to detecting an impact occurred on the electronic device, determining at least one of a location of the impact on the electronic device or a degree of the impact, based on the at least one physical value, and displaying the at least one of the location of the impact or the degree of the impact.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
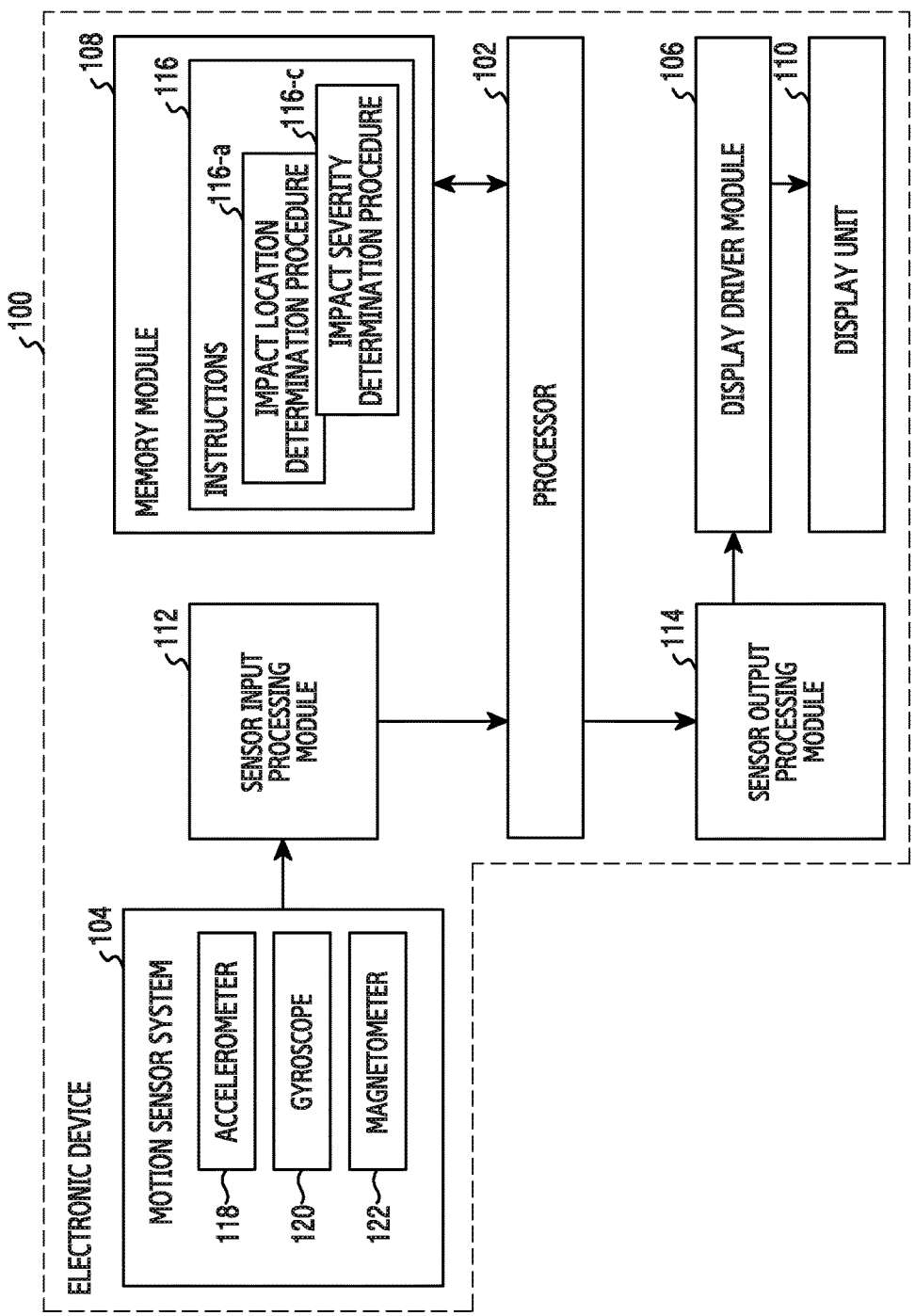
FIG. 1 is a block diagram of an illustrative implementation of a device for detecting and visually representing an impact event according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various arrangements such as method and electronic device, and their associated computer-implemented and/or computer-enabled methods-steps or processes and various embodiments are disclosed for detecting and visually representing an impact event which may be monitored in accordance with the principles and concepts of the present disclosure. These arrangements, their embodiments, their features and other possible aspects of the present disclosure are described in further and greater detail below and are accompanied with non-limiting illustrations through appropriate diagrams.

The arrangements of the present disclosure, including various computer-implemented, computer-based, computer-assisted, and/or computer-designed aspects, methods, processes, and configurations, may be implemented on a variety of electronic computing devices and systems, portable or stationary, including electronic client devices and/or server computers, wherein these computing devices include the appropriate processing mechanisms and computer-readable media for storing, fetching, executing, and interpreting computer-readable instructions, such as programming instructions, codes, signals, and/or the like.

Further, various embodiments of the present disclosure may he implemented on, or in conjunction with, existing controllers in control systems of computers or computing devices which are well-known in the art. All the ensuing disclosures and accompanying illustrations of the preferred embodiments of the present disclosure are merely representative for the purpose of sufficiently describing the manner by which the present disclosure may be carried out into practice in various ways other than the ones outlined and/or exemplified with great details in the ensuing description.

It is to be understood and appreciated by a person skilled in the art or having ordinary skills in the art, however, that various embodiments used to describe how to make and use the present disclosure may be embodied in many alternative forms and should not be construed as limiting the scope of the appended claims in any manner, absent express recitation of those features in the appended claims. All the diagrams and illustrations accompanying the ensuing description should also not be construed as limiting the scope of the appended claims in any manner.

It is also to be understood and appreciated that the use of ordinal terms like "first," "second," and "third" is used herein to distinguish one element, feature, component, calculation or process step to another and should not also be construed as limiting the scope of the appended claims, and that these and such other ordinal terms that may appear in the ensuing description are not indicative of any particular order of elements, features, calculations, components or process steps to which they are attached. For example, a first element could be termed a second element or a third element. Similarly, a second element or a third element could be termed a first element. All these do not depart from the scope of the herein disclosure and its accompanying claims.

Unless the context clearly and explicitly indicates otherwise, it is to be understood that like reference numerals refer to like elements throughout the ensuing description of the figures and/or drawings, that the linking term "and/or" includes any and all combinations of one or more of the associated listed items, and that some varying terms of the same meaning and objective may be interchangeably used.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

FIG. 1 illustrates a block diagram of an illustrative implementation of a device for detecting and visually representing an impact event according to an embodiment of the present disclosure.

In one embodiment, as shown in the block diagram of FIG. 1, the present disclosure is arranged to provide an electronic device, which is generally designated by reference numeral 100 throughout the ensuing detailed description, for detecting and visually representing an impact event. The device 100 may include at least one data processor 102, a motion sensor system 104, a display driver module 106, a memory module 108, a display 110, a sensor input processing module 112, and a sensor output processing module 114.

It is to be understood and appreciated through the ensuing disclosure that these components and their associated subcomponents, parts and/or elements are merely illustrative for the purpose of illustrating the manner by which the present disclosure may be performed and may or may not correspond to actual operating configurations of known devices, and that other components which are not described herein may be well known so as to constitute the operating configuration of the device 100 arranged to detect and visually represent an impact event.

The device 100 is preferably a portable, handheld and/or battery-operated electronic device comprising the display 110 of the configuration which displays graphical unit interfaces (GUIs) and/or renders a visual representation of image and/or video signals. The device 100 may be, by way of example and not by way of limitation, a mobile phone such as one of the smart-phone models from Samsung™ or Apple™ or Nokia™ a tablet computer such as the Samsung™ Galaxy Tab™ or Apple™ iPad™, a digital camera such as one of the digital single-lens reflex camera (DLSR) models from Canon™ or Nikon™, a multimedia player such as the Apple™ iPod™ or the MP3 player or digital versatile disc (DVD) player, a digital television such as one of the Samsung™ Smart TV™ models, a gaming device such as one of the playstation portable (PSP) models from Sony™, and a laptop computer such as one of the laptop models which are well known in the art.

These portable devices which may characterize the device 100 may be subjected to impact condition if they fall and/or hit hard surfaces, It is to be understood and appreciated that the device 100 may also be a stationary device such as a desktop computer, a workstation computer, or a supercomputer. While these stationary devices of the related art are not usually dropped as they are stationary, they may still experience shock, damage, or fracture causing impact if a hard object such as a stapler or a portable electronic device hits them.

According to various embodiments of the present disclosure, the device 100 may be any combination of the foregoing devices. In addition, it will be apparent to one having ordinary skill in the art that a device according to various embodiments of the present disclosure is not limited to the foregoing devices.

The data processor 102 of the device 100 may be a single processor or multiple processors which fetch and execute computer-executable instructions 116 from the memory module 108 containing them. The memory module 108 is preferably a main storage device of the device 100 of the present disclosure, and may be non-volatile. It is to be understood and appreciated that the memory module 108 may include one or more of the well-known random access memory (RAM), read-only memory (ROM), and electrically erasable programmable ROM (EEPROM), and the like.

One or more implementations of the device 100 and its associated method may be realized by executing the instructions 116 from the memory module 108. The instructions 116 may be represented by computer program codes which may be written in a variety of suitable programming languages, such as C, C#, C++, C#.NET, Java, Objective-C, Swift, and Visual Basic.

The processor 102 of the device 100 may be selected from one of the well-known micro-controllers (MCUs) with embedded RAM/ROM, microprocessors (MPUs) not capable of being programmed such as general purpose MPUs and/or special purpose MPUs, and application specific integrated circuits (ASICs), programmable MPUs such as reduced instruction set computing (RISC) and/or related chips sets, complex instruction set computing (CISC) and/or related chips sets, and programmable devices such as complex programmable logic devices (CPLDs), and programmable chips such as field-programmable gate arrays (FPGAs). It is preferable that the processor 102 may also comprise any suitable structure and number of memories for caching purposes.

Integrated into the device 100 and communicatively coupled to the processor 102 is the motion sensor system 104. Preferably, although not exclusively, the motion sensor system 104 includes motion sensors such as an accelerometer 118, a gyroscope 120, and magnetometer 122. Any one or more of the motion sensors 118, 120, 122 may be electronically connected to the processor 102 of the device 100 through appropriate wire bonding connections or printed flex circuitry connections.

Each of the motion sensors 118, 120, 122 may be strategically situated (e.g., in the middle center of the device 100)

and may be fixedly mounted within the primary case, shell, or board of the device 100 using any suitable attachment mechanism such as adhesive, semi-adhesive, thermal bonding, welding, soldering, friction fitting, pins and/or screws.

Each of the motion sensors 118, 120, 122 may be low profile sensors which can be either mounted on any available surface of a printed circuit board pre-arranged in the device 100 or directly embedded within the same structure. it is preferable that the motions sensors 118, 120, 122 may be directly embedded within, or built-in with, such structure so as to improve their resistance against potential adverse effects of the external environment and as well as their responsive capacity. Any one or more of the motion sensors 118, 120, 122 which may constitute the motion sensor system 104 of the device 100 may be hardware-based, software-based, hardware and software-based and/or microelectromechanical systems (MEMS)-based, depending on the structure and/or configuration of the device 100.

Figure 2:
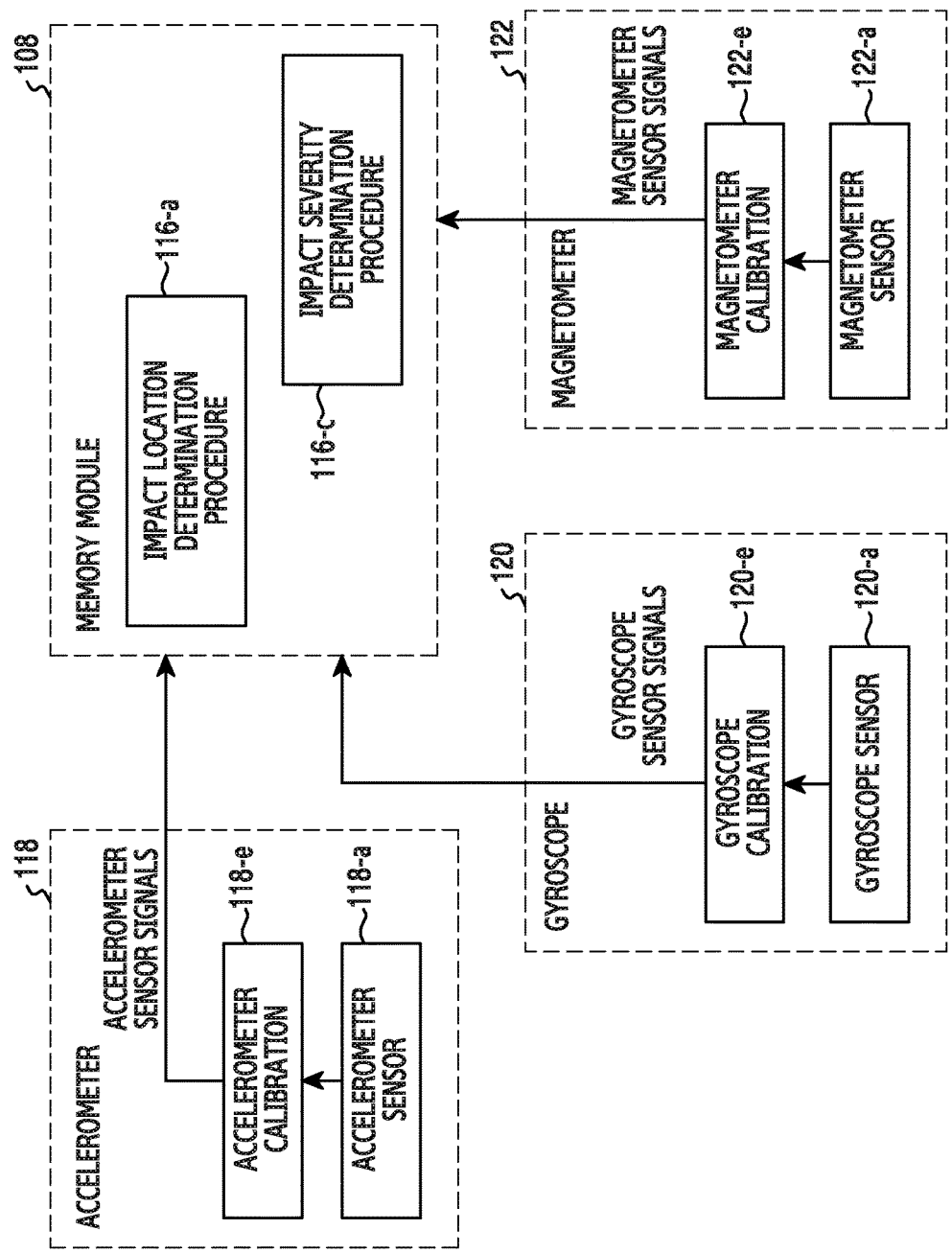
FIG. 2 is a block diagram of an illustrative implementation of a motion sensor system of the device of FIG. 1 according to an embodiment of the present disclosure.

FIG. 2 illustrates a block diagram of an illustrative implementation of a motion sensor system of the device of FIG. 1 according to an embodiment of the present disclosure.

As shown in the block diagram of FIG. 2 in conjunction with the block diagram of FIG. 1, the accelerometer 118 may include an accelerometer sensor 118-*a* for sensing and outputting acceleration signals or readings representative of the motion of the device 100. The accelerometer sensor 118-*a*, when in operation, may generate the accelerometer sensor signals which may be measurements representative of magnitude and direction of acceleration of the device 100 while it is in a flight. In order to ensure accuracy of the accelerometer sensor signals, an accelerometer calibration module 118-*e* may be included in the accelerometer 118 for calibrating the accelerometer sensor 118-*a*. The accelerometer calibration module 118-*e* may be adapted to compensate for, correct, or substantially eliminate any potential inherent bias errors of the accelerometer 118.

As also shown in the block diagram of FIG. 2 in conjunction with the block diagram of FIG. 1, the gyroscope 120 may include a gyroscope sensor 120-*a* for sensing and outputting rotation signals or readings representative of a rotational motion of the device 100. The rotation signals may be angular rotation signals. The gyroscope sensor 120-*a*, when in operation, may generate the gyroscope sensor signals which may be measurements representative of angular velocity or velocity of the rotation of the device 100. In order to ensure accuracy of the gyroscope sensor signals, a gyroscope calibration module 120-*e* may be included in the gyroscope 120 for calibrating the gyroscope sensor 120-*a*. The gyroscope calibration module 120-*e* may be adapted to compensate for, correct, or substantially eliminate any potential errors of the gyroscope 120 due to drift.

As still shown in the block diagram of FIG. 2 in conjunction with the block diagram of FIG. 1, the magnetometer 122 may include a magnetometer sensor 122-a for sensing and outputting magnetic field signals or readings representative of a magnetic field of the earth serving as a reference point for the rotation signals outputted by the gyroscope sensor 120-*a* of the gyroscope 120. The magnetometer sensor 122-*a*, when in operation, may generate magnetometer sensor signals or readings which may be measurements representative of a magnetic field signals associated with an axial rotation and/or angular rotation corresponding to a change in an orientation of the device 100. In order to ensure accuracy of the magnetometer sensor signals, a magnetometer calibration module 122-*e* may be included in the magnetometer 122 for calibrating the magnetometer sensor 122-*a*. The magnetometer calibration module 122-*e* may be adapted to compensate for, correct, or substantially eliminate any potential inherent errors of the magnetometer 122 due to drift and interference by the external environment.

The acceleration sensor 118-*a* of the accelerometer 118 constituting the motion sensor system 104, alone, may be the minimum required to determine whether an impact has occurred on the device 100. The gyroscope and magnetometer sensors 120-*a*, 122-*a* of the gyroscope 120 and magnetometer 122, cooperating with one another, may be the minimum required to determine the orientation of the device 100 as and when it experiences an impact, for example, by hitting the ground or being hit by another object such as a stone, to determine the location of the impact based on the orientation of the device 100, and to determine severity of the impact based on the determined location.

It is to be understood and appreciated that other sensors which perform substantially the same as any one or more of the motion sensors 118, 120, 122 and/or which may supplement the impact determination, orientation determination, impact location determination and impact severity determination can be integrated into the device 100. These other sensors may include, by way of example and not by way of limitation, proximity sensors, pressure sensors, light sensors, ambient light sensors, displacement sensors, capacitive sensors, hall effect sensors, vibration sensors, sound sensors, strain sensors, temperature sensors, and moisture sensors.

The acceleration signals outputted by the accelerometer 118, the rotation signals or angular rotation signals outputted by the gyroscope 120 and the magnetic field signals outputted by the magnetometer 122 may be stored locally in the accelerometer 118, the gyroscope 120, and the magnetometer 122 if they include storage devices (not illustrated), directly in the memory module 108, or in a network storage device (not illustrated) over any suitable wired or wireless communication network such as the Internet.

In one embodiment, the sensor signals 118-*c*, 120-*c*, 122-*c* that may be stored in the respective storage devices of the accelerometer 118, gyroscope 120, and magnetometer 122 can be mirrored in the memory module 108. It is now apparent that the acceleration, rotation and magnetic field signals 118-*c*, 120-*c*, 122-*c* sensed by the accelerometer 118, gyroscope 120, and magnetometer 122, respectively, constitute impact parameters which correspond to a motion or a set of motions of the device 100 at various points in time. Consequently, the acceleration readings or signals 118-*c*, angular rotation readings or signals 120-*c*, and magnetic field readings or signals 122-*c* constitute impact parameter information which correspond to the sensed impact parameters by the motion sensor system 104.

Simply put, the motion sensor system 104 comprising the accelerometer 118, gyroscope 120, and magnetometer 122 are configured to sense the impact parameters corresponding to the motion of the device 100, and to generate the impact parameter information associated with the sensed impact parameters. The instructions 116 contained in the memory module 108, which is in communication with each of the processor 102 and the motion sensor system 104, may form at least first and second decision-making procedures 116-*a*, 116-*c*. It is to be understood and appreciated that the procedures 116-*a*, 116-*c* may include routines such as communication, signaling and control routines.

The first decision-making procedure 116-*a* may be characterized by impact determination procedure and impact location determination procedure and/or method, hereinafter collectively referred to as "impact location determination procedure" for simplicity (as shown in the flow diagram of FIG. 3). The impact location determination procedure and/or method 116-a is executable by the processor 102 from the memory module 108.

Figure 3:
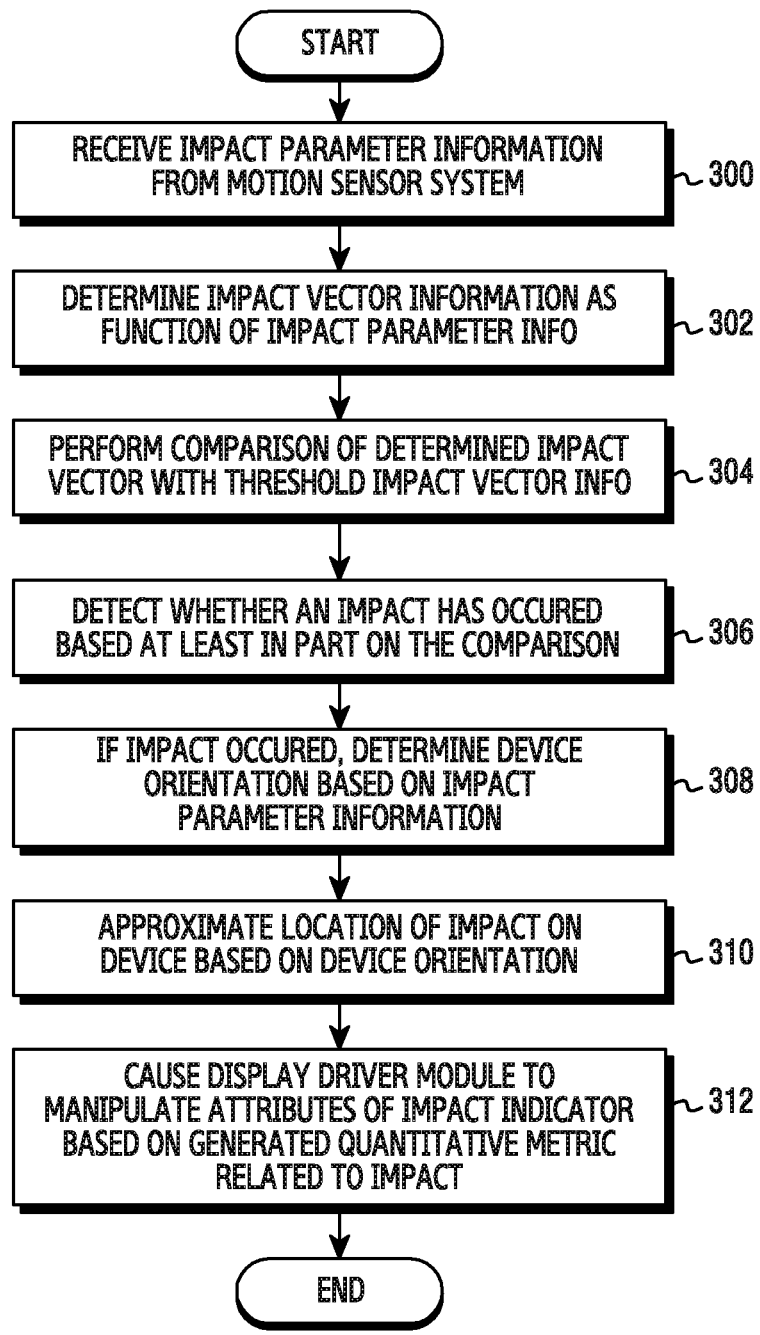
FIG. 3 is a flow diagram of an illustrative method of detecting and visually representing an impact event according to an embodiment of the present disclosure.

FIG. 3 illustrates a flow diagram of an illustrative method of detecting and visually representing an impact event according to an embodiment of the present disclosure.

Referring to FIG. 3, at operation 300, the processor-executed impact location determination procedure 116-a causes the processor 102. to receive the impact parameter information from the motion sensor system 104. The impact parameter information, i.e., the acceleration, rotation or angular rotation, and magnetic field signals may be stored in the memory module 108 of the device 100, and can be digitally and graphically represented on the display 110 through the display driver module 106 of the device 100.

It may be desired that the impact parameter information transmitted from the motion sensor system 104 to the memory module 108 by the processor 102 undergo one or more normalization processes, using one or more filters, by passing through the sensor input processing module 112. Such filters may include, by way of example and not by way of limitation, Kalman and Complementary filters.

The sensor input processing module 112 may be used to perform noise reduction and standardize the sensor readings or sensor signals obtained from the accelerometer sensor 118-a of the accelerometer 118, gyroscope sensor 120-a of the gyroscope 120, and magnetometer sensor 122-a of the magnetometer 122, respectively. The sensor input processing module 112 may operate or function under the control of the motion sensor system 104 and/or under the control of the impact location determination procedure 116-a in the memory module 108 through the processor 102 of the device 100.

At operation 302, the impact location determination procedure 116-a may cause the processor 102 to determine an impact vector information as a function of the impact parameter information which may originate from the motion sensor system 104, which may pass through the sensor input processing module 112, and which may include fall parameter information. This function may be representative of any one or more relationships between two or more of the acceleration signals from the accelerometer 118. For example, the impact vector information may have or may correspond to a value of 20.5 m/s$^2$, the detailed illustration of which is shown in the ensuing graphical and pictorial diagrams.

Prior to determining the impact vector information as the function of the impact parameter information, the impact location determination procedure 116-a may also be executable by the processor 102 from the memory module 108 to perform the noise reduction operation on the acceleration signals, the rotation signals and the magnetic field signals.

At operation 304, the impact location determination procedure 116-a may cause the processor 102 to perform a comparison of the determined impact vector information with a threshold impact vector information. The threshold impact vector information may be any predefined value which may correspond to a threshold acceleration information that is indicative of a shock, damage or fracture causing impact. For example, the threshold impact vector information may have or may correspond to a value of 19.6 m/s$^2$, the detailed illustration of which is shown in the ensuing graphical and pictorial diagrams.

At operation 306, the impact location determination procedure 116-a may cause the processor 102 to detect whether an impact has occurred based at least in part on the comparison made in respect of the determined impact vector information and the threshold impact vector information. In one embodiment, such impact occurs if and when the determined impact vector information is of equal or higher value as compared with the threshold impact vector information. In the given examples, the 20.5 m/s$^2$ value of the impact vector information is higher than the 19.6 m/s$^2$ value of the threshold impact vector information. Thus, processor 102 may be caused by the impact location determination procedure 116-a to detect and/or establish that an impact has occurred on the device 100.

At operation 308, if the impact has occurred as it appears in the given example values of the determined and threshold impact vector information, the impact location determination procedure 116-a may cause the processor 102 to determine an orientation of the device 100 based on the impact parameter information which may include or correspond to the angular rotation signals from the gyroscope 120 and the magnetic field signals from the magnetometer 122 serving as point of reference for the angular rotational signals from the gyroscope 120.

The impact determination aspect of the impact location determination procedure 116-a may use any suitable mathematical methods which are known in the art for detecting an impact (e.g., due to fall) which takes into consideration the impact parameter information including the measurements or sensor readings from the motion sensor system 104. One exemplary mathematical method is disclosed in United States Publication No. 2016/0054354 published on Feb. 25, 2016 to Invensense, Inc. (USA), the full content of which is incorporated herein by reference in its entirety and for all purposes.

At operation 310, the impact location determination procedure 116-a may cause the processor 102 to approximate a location of the impact on the device 100 based on the determined orientation of the same device 100. The orientation of the device 100 may be determined and/or approximated using the sensor readings from the motion sensor system 104.

At operation 312, the impact location determination procedure 116-a may cause the processor 102 to cause the display driver module 106 to display on the display 110 of the device 100 an impact indicator corresponding to the approximated location of the impact. The impact indicator may be graphical, textual, tabular, numerical, multimedia audio and/or video content, animated content, or any suitable combination thereof.

Information associated with the impact indicator may be pass through the sensor output processing module 114 which may operate or function under the control of the motion sensor system 104 and/or under the control of the impact location determination procedure 116-a in the memory module 108 through the processor 102. The sensor output processing module 114 may be used to temporarily store the information associated with the impact indicator and/or indicate or identify the destination address or addresses to which the same information is set to be transmitted.

For example, the destination address may correspond to the address in any one of the memory module 108, an external storage device, the network storage device, and third-party computer systems such as web servers (not illustrated). These devices and systems other than the memory module 108 may be set to fetch any desired information associated with the impact indicator from the device 100. For example, such desired information may include the impact parameter information, time and/or date information, timer/counter values, sensor data, threshold comparison results, impact direction and/or magnitude, fall detection parameters, impact detection parameters, and the like.

The second decision-making procedure 116-c, which may be a continuation of the first decision-making or impact location determination procedure 116-a, may be characterized by impact severity determination procedure and/or method, hereinafter collectively referred to as "impact severity determination procedure" for simplicity (as shown in the flow diagram of FIG. 4). The impact severity determination procedure and/or method 116-c is executable by the processor 102 from the memory module 108.

Figure 4:
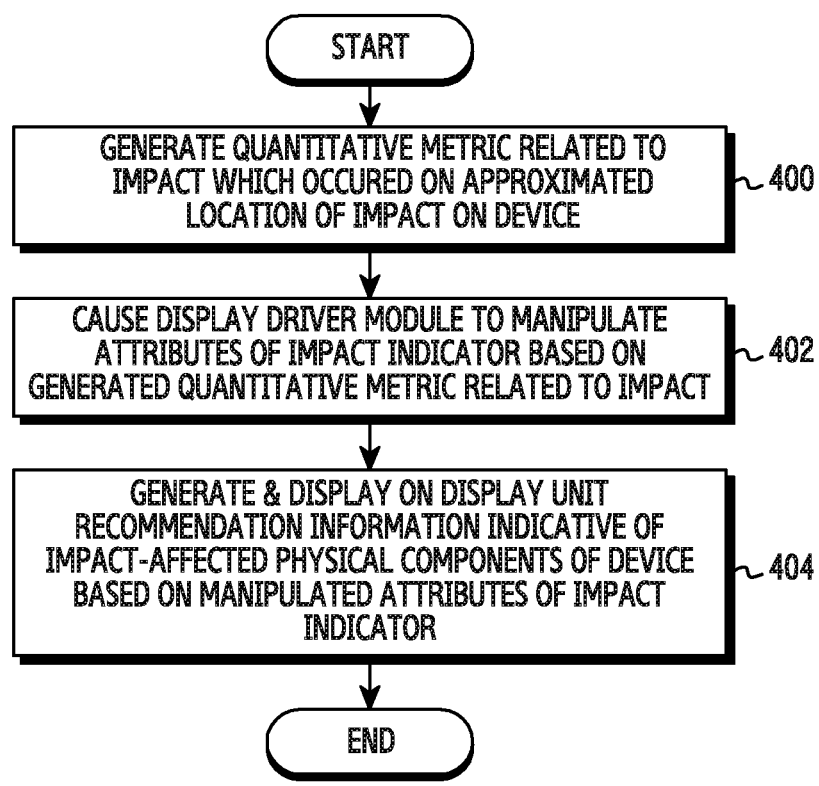
FIG. 4 is a flow diagram of a continuation of the method of FIG. 3 according to an embodiment of the present disclosure.

FIG. 4 illustrates a flow diagram of a continuation of the method of FIG. 3 according to an embodiment of the present disclosure.

Referring to FIG. 4, at operation 400, the impact severity determination procedure 116-c may cause the processor 102 to generate a quantitative metric related to the impact which occurred on the determined location on the device 100. The quantitative metric may be, by way of example and not by way of limitation, a count of a number of times that the impact has occurred on the determined location on the device 100, a sum of a number of times that the impact has occurred on neighboring impact locations on the device 100, and a sum of a number of times that the impact has occurred in different locations on the device 100 in accordance with one predefined area or perimeter on the device 100, if and whenever an impact event is detected and the process-steps illustrated in FIG. 3 are iterated for each impact event.

At operation 402, the impact severity determination procedure 116-c may cause the processor 102 to cause the display driver module 106 to manipulate attributes of the impact indicator based on the generated quantitative metric which may be, for example, the count of the number of times that the impact has occurred on the determined location.

At operation 404, the impact severity determination procedure 116-c may cause the processor 102 to generate and display on the display 110 recommendation information which are indicative of one or more possible impact-affected physical components of the device 100 based on the manipulated attributes of the impact indicator.

The impact location determination procedure 116-a may be executed to provide historical data that keep track of the number of times that the impact has occurred on the device 100 while the impact severity determination procedure 116-c may be executed to generate the recommendation information which serves as smart suggestions indicating any impact-affected physical components of the device 100 that should be examined for possible damages.

The physical components of the device 100 which may be affected by the one or more impact events may include, by way example and not by way of limitation, the processor 102, the memory module 108, the motion sensor system 104, other motion sensor structures, the display 110 which may be a multi-sensing touch display panel or display screen, an external storage device such as a secure digital (SD) card or micro SD card, a power button, a back button, a home button, a power circuitry, a reset circuitry, an audio circuitry, a volume circuitry, a transceiver circuitry, charge and discharge circuitries, a vibration circuitry, a ringer circuitry, a cellular circuitry, a global positioning system (GPS) circuitry, a global navigation satellite system (GLONASS) circuitry, a personal communications service (PCS) circuitry, a switching arrangement such as a compact detection switch, an antenna, a microphone, a microphone connector, a headphone connector, a speaker, a universal serial bus (USB) connector, an high-definition multimedia interface (HDMI) connector, a dock connector, a connector slot, a stylus/pen slot, a subscriber identity module (SIM) card reader, a card reader, a short to medium range communication reader such an near field communication (NFC) reader and a Bluetooth reader, a communication and/or broadcast module, a user interface (UI) module, a volume control, a front-facing camera, a rear camera, and the like.

Coordinates of the physical locations of the physical components of the device 100 may be stored in any suitable database system or in the memory module 108. The impact location or locations that may be determined by the impact location determination procedure 116-a may be compared with the physical location of the physical components of the device 100 in order to determine which of such components are possibly affected by the determined impact in terms of shock, damage and/or fracture.

Figure 5:
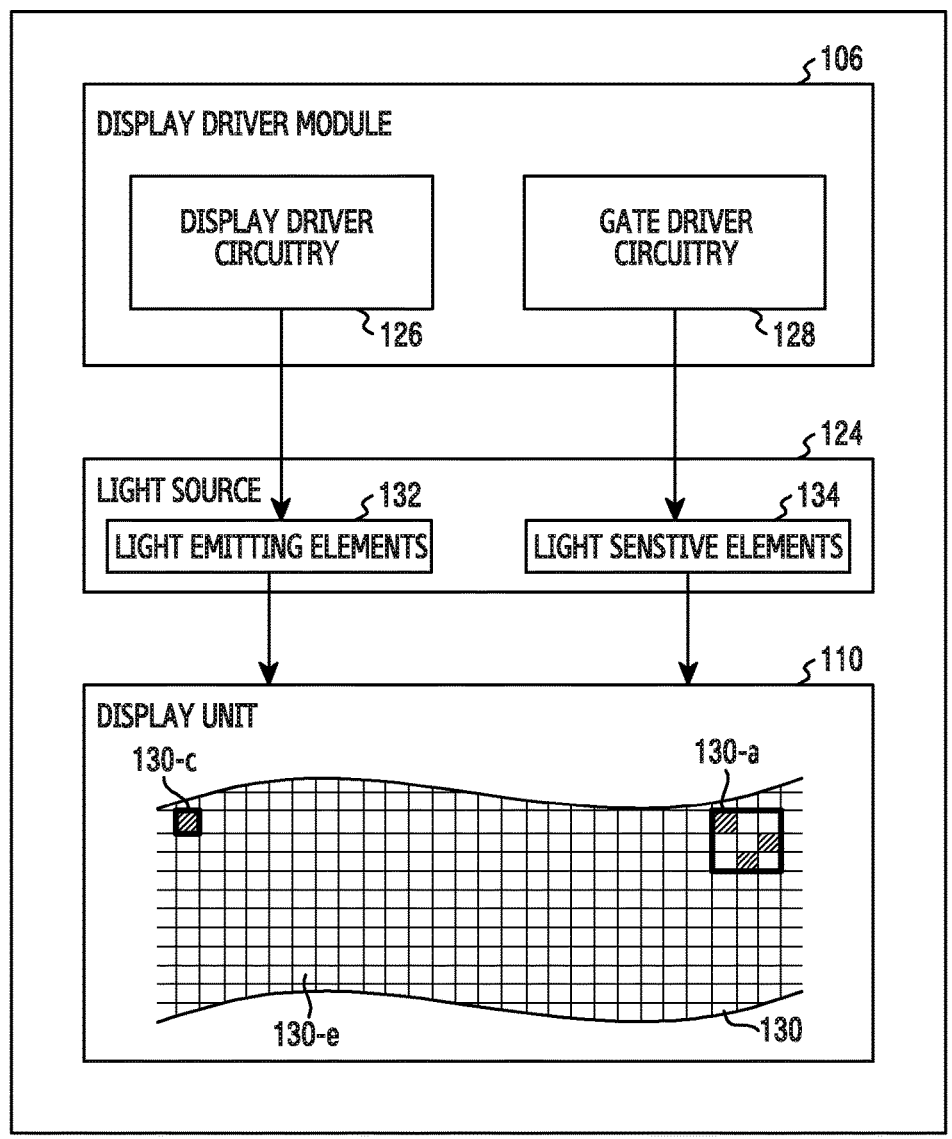
FIG. 5 is a block diagram of a display of the device of FIG. 1 according to an embodiment of the present disclosure.

FIG. 5 illustrates a block diagram of a display of the device of FIG. 1 according to an embodiment of the present disclosure.

As illustrated in the block diagram of FIG. 5, the impact indicator may be a light pattern such as a colored light pattern projected by a light source 124 operatively coupled to the display driver module 106. The display driver module 106 may include a display driver circuitry 126 and a gate driver circuitry 128. The display driver circuitry and the gate driver circuitry 126, 128 may be generally used to control an operation of an array of display pixels 130 through appropriate control signals and pulses, and may specifically fill the display pixels 130 with default or otherwise inferred pixel values (e.g., red, green, and blue (RGB), or RGB for brevity, pixel values) based on impact indicator determined by the impact location and impact severity determination procedures 116-a, 116-c executing on the processor 102 from the memory module 108.

The light source 124 may be one or both of a set of light emitting elements 132 and light sensitive elements 134. Preferably, the colored light pattern projected by any one of the light emitting elements 132 and light sensitive elements 134 is adapted to change in color in response to the quantitative metric generated by the impact severity determination procedure 116-c executing on the processor 102 from the memory module 108. The display driver module 106 may be arranged to operate the display 110 which may be in the form of, or may include, the light emitting elements 132 and/or the light sensitive elements 134. The display 110 may comprise the display pixels 130 which may function to emit or absorb light according to signals and/or pulses generated by the display driver module 106.

The light emitting elements 132 may be light-emitting diodes (LEDs), organic LEDs (OLEDs), flexible LEDs, quantum dot LEDs (QLEDs), flexible QLEDs, active-matrix OLEDs (AMOLEDs), or super AMOLEDs, and/or may be based on various thin and flexible light emitting technologies, laser diodes, and/or other related semiconductor devices which are well known in the art.

In one embodiment, the display driver module 106 may serve as a source for power supply signals which may include, by way of example and not by way of limitation, low voltage signals, medium voltage signals, high voltage signals, voltage drop signals, voltage increase signals, and few or more power supply signals of varying voltage level, amplitude, frequency and amperage.

The display pixels 130 of the display 110 of the device 100 may be operated under the control of the display driver module 106 based on any one of the aforementioned power supply signals to cause manipulation of one or more properties of the impact indicator displayed on the display 110 based on the result of the impact severity determination procedure 116-c which is illustrated in greater details in FIGS. 1 and 4. Such properties may include, by way of example and not by way of limitation, the distribution or the degree of intensity and brightness of the light emitted by the light emitting elements 132. In one embodiment, a lower or higher quantitative metric or count of the number of occurrence of impact on a particular location of a device 100 may enable the display driver module 106 to cause the light displayed on the display 110 of the device 100 to have higher or otherwise lower intensity and/or brightness level, respectively. For example, the first area 130-a which is depicted to have three impact points or locations may have lower intensity (wherein color may appear faint and/or dull) while the second area 130-c which is depicted to have one impact point or location may have higher intensity (wherein hue may appear bright). Further, the third area 130-e which is depicted to have no impact point or location may have a balance level of intensity and/or brightness.

The light sensitive elements 134 may be colorimetric and/or spectrophotometric light sensitive elements 134 which may be arranged to have a form factor of a light sensor or a colorimeter operatively coupled to the device 100 and generally configured to gather the light emitted by the light emitting elements 132 of the device 100. The colorimetric and/or spectrophotometric light sensitive elements 134 may be utilized for gathering colored light and may be arranged to correspond to the array of colored display pixels 130 in the display 110 of the device 100.

In one embodiment, the display 110 having the RGB display pixels 130 may be calibrated to produce a multi-colored light pattern comprising gradients of green, yellow and red based on the RGB colorimetric and/or spectrophotometric light sensitive elements 134. For example, the first area 130-a which is depicted to have three impact points or locations may have gradients of red while the second area 130-c which is depicted to have one impact point or location may have gradients of yellow. Further, the third area 130-e which is depicted to have no impact point or location may have gradients of green.

Alternatively, and in another embodiment, the light sensitive elements 134 may be arranged to generate various intensities (e.g., $R_{max}$, $G_{max}$, $B_{max}$) of a spectrum of light colors and directly correspond to the display pixels 130 of the display 110 thereby rendering the various intensities of the light colors comprising the gradients of green, yellow and red directly on the display pixels 130 of the display 110 or, simply put, filling the display 110 of the device 100 with pixel values which form colored light pattern and/or designs in accordance with the various intensities of the full spectrum of light colors.

It is to be understood and appreciated that the above arrangements for displaying on the display 110 of the device 100 the colored light pattern corresponding to, representative of and/or serving as the impact indicator are merely illustrative and not exclusive. For example, the display pixels 130 of the display 110 of the device 100 may include individual pixels 130 having colors other than the aforementioned red, green and blue.

In another example, the colorimetric and/or spectrophotometric light sensitive elements 134 may include tools or mechanisms for accurately generating and redirecting different colors, or frequencies, of light onto different regions of the display pixels 130 of the display 110 of the device 100 based on the result of the impact severity determination procedure 116-c which is illustrated in greater details in FIGS. 1 and 4, wherein the display driver module 106 is caused by the processor-executing impact severity determination procedure 116-c to manipulate the attributes (e.g., the intensities) of the impact indicator (i.e., the colored light pattern) based on the generated quantitative metric (e.g., the count of the number of times the impact has occurred on a particular location or area in the device 100).

It is to be understood and appreciated that the three-colored light pattern may have any number of different colors including or excluding any of the green, yellow and red, and that the gradation characteristics of the impact indicator may not be based solely on the colored light pattern but, as an alternative, also on any one of gray scale, monochrome, or black and white pixel values if and whenever applicable and appropriate, for example, in cases where the device 100 has computational resources such as processing and memory resources which are too limited to produce colored graphics or where the display 110 of the device 100 is inherently not capable of producing colored light graphics. In one instance, some cameras and music players are inherently configured to display monochrome graphics at a low resolution.

It is also to be understood and appreciated that the impact indicator may also be in the form of a graphically represented pictorial image corresponding, for example, to the count of impact occurrence on the device 100. For example, if the count has a higher value (e.g., 8 counts), then the pictorial image may be a dark red warning sign an exclamation point inside a yellow or red triangle). Correspondingly, if the count has a lower value (e.g., 1 count), then the pictorial image may be a light green "check" sign, "OK" sign, "thumbs up" sign, "OK hand signal" sign, a "heart" sign, or the like. Another possible graphical representation which may correspond to the impact indicator is full bar of any suitable configurations that may be arranged to decrease in size as the count of the impact occurrence on the device 100 increases.

Figure 6:
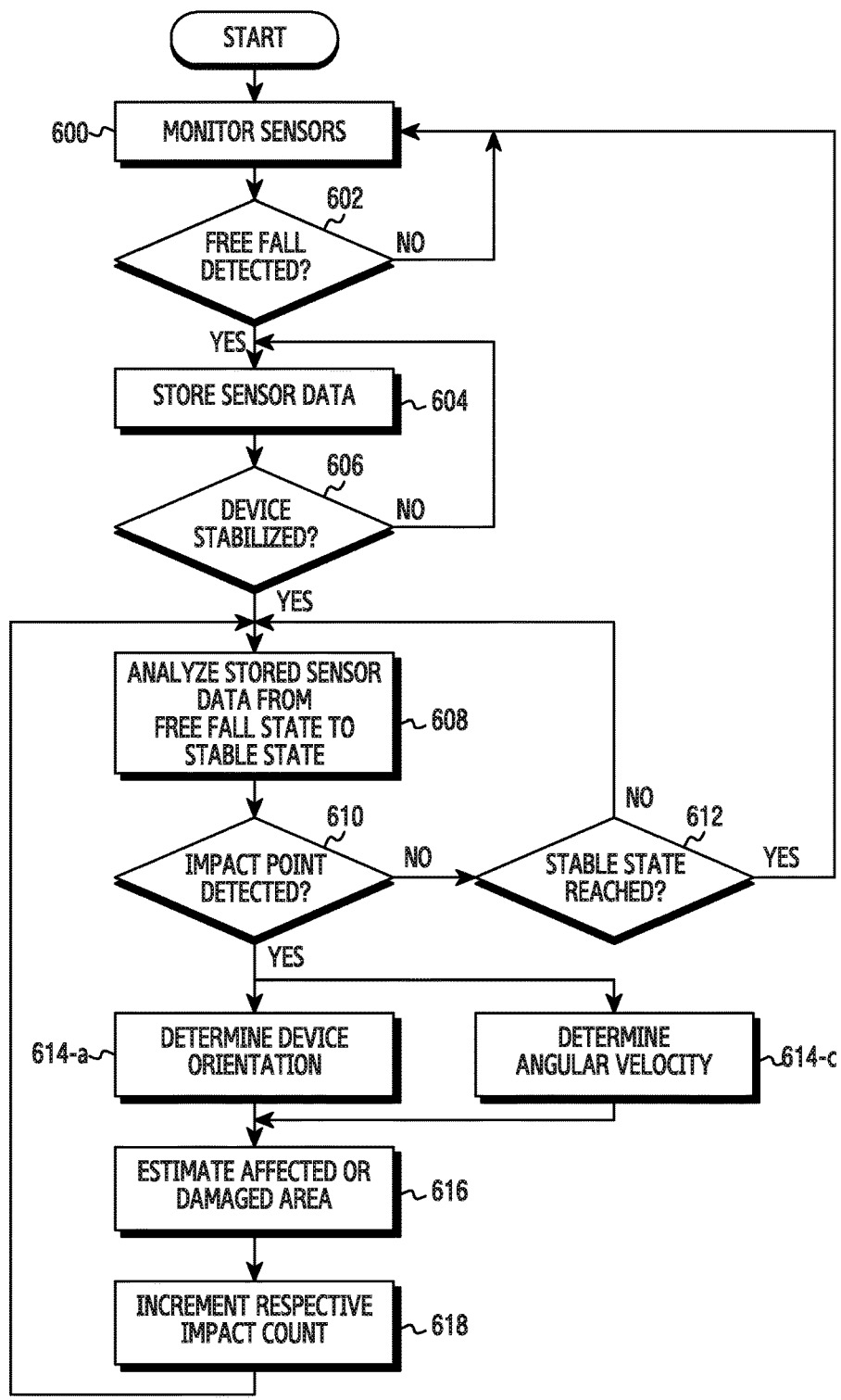
FIG. 6 is a flow diagram of a computer-implemented process according to an embodiment of the present disclosure.

FIG. 6 illustrates a flow diagram of a computer-implemented process according to an embodiment of the present disclosure.

Referring now to the flow diagram of FIG. 6 which illustrates a computer-implemented impact monitoring process associated with the method and device 100 of the present disclosure. With more particularity and greater details, the impact monitoring process illustrated in FIG. 5 combines the impact location determination and impact severity determination procedures 116-a, 116-c which are partly illustrated in FIGS. 3 and 4, respectively. It is to be understood and appreciated that impact monitoring process may be adjusted so that it may be compatible with the device 100 and depending on the framework of the device 100.

The impact monitoring process combining, in whole or in part, the impact location determination and impact severity determination procedures 116-a, 116-c may be logically executed as an application program which may be tangibly embodied on a program memory or computer-readable medium or on the memory module 108 of, or may be uploaded to, and executed by, the device 100 or any such other computer platform of any suitable architecture. Preferably, this impact monitoring process is executed through the hardware and software components of the device 100 as illustrated in greater details in FIGS. 1 and 2.

At operation 600, the impact monitoring process is arranged to always monitor the device 100 in order to gather the data needed to analyze any changes in the state of the device 100, wherein the accelerometer data, the gyroscope data and the magnetometer data are collected for later analysis if and whenever needed.

The accelerometer data may originate from the accelerometer 118 which measures the acceleration (gravitational force inclusive) of the device 100 towards or in the direction of the X, Y and Z axes. For example, the device 100 at rest on a surface should have a gravitational force straight upwards (z=9.8 m/s$^2$). In contrast, if the device 100 is experiencing a free fall, all axes have an acceleration of zero ("0"). The accelerometer may be arranged to detect the free fall of, and also impact on, the device 100. The gyroscope data may originate from the gyroscope 120 which measures the velocity of the rotation of the device 100 relative to the X, Y and Z axes. The magnetometer data may originate from the magnetometer 122 which provides the direction of the earth's north pole, effectively providing the device 100 with a reference point or frame of reference for the readings of the gyroscope 120 of the motion sensor system 104.

Figure 7A:
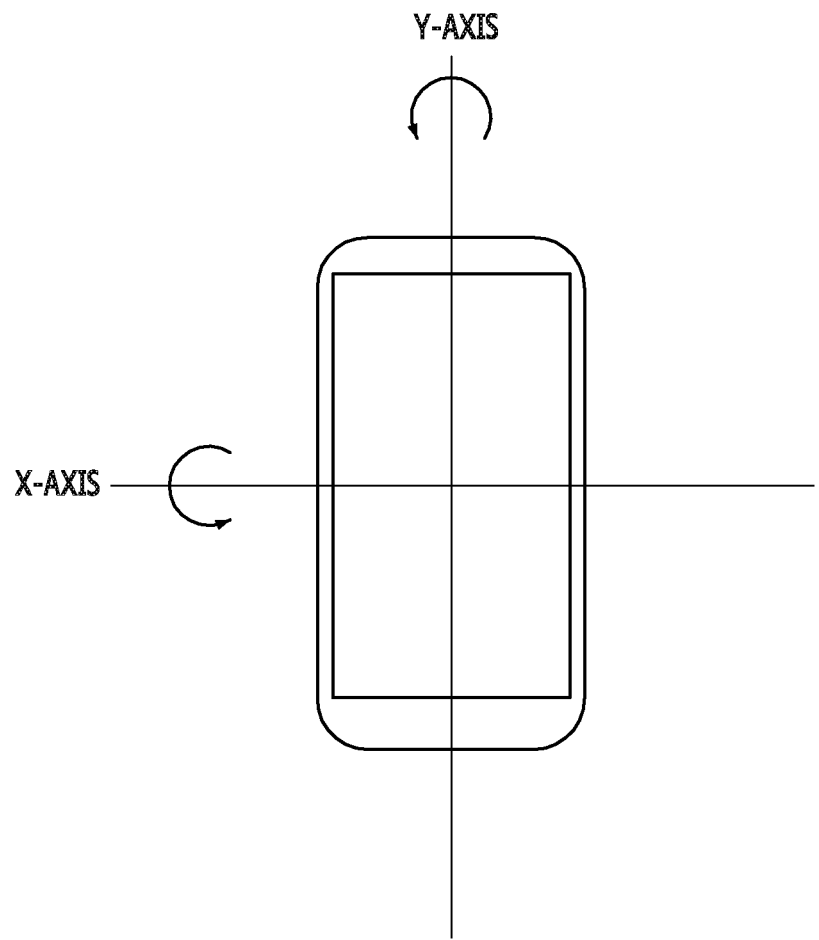
FIGS. 7A, 7B, and 7C are pictorial diagrams showing a multi-axis motion of the device of FIG. 1 according to various embodiments of the present disclosure.
Figure 7B:
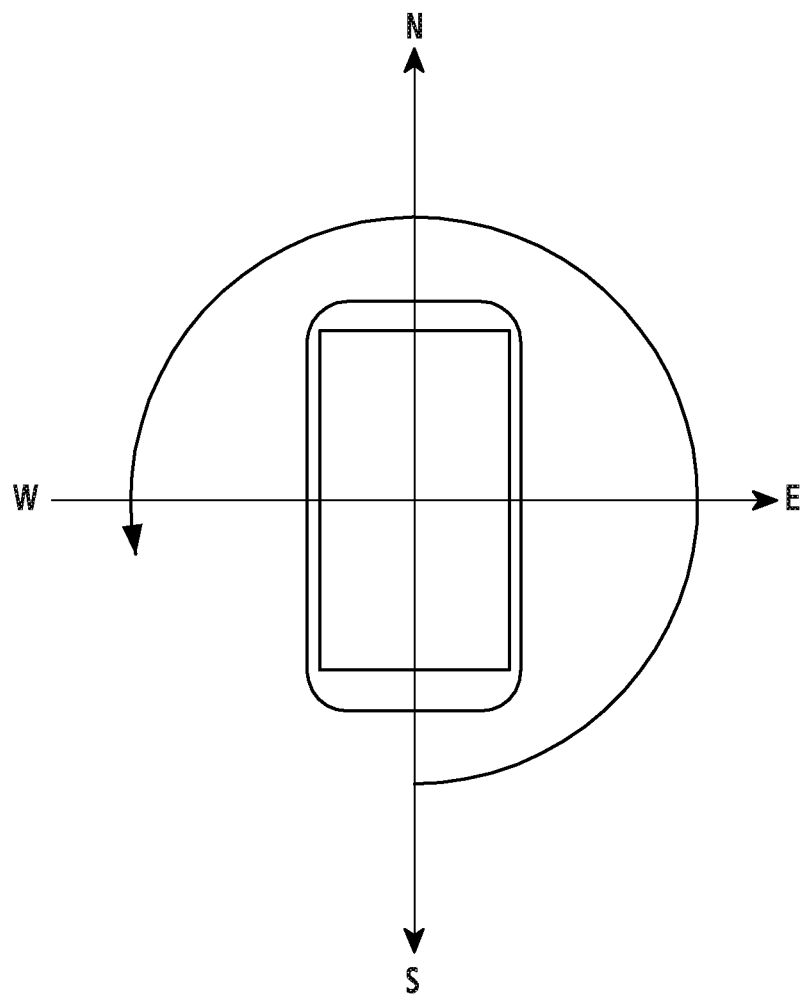
Figure 7C:
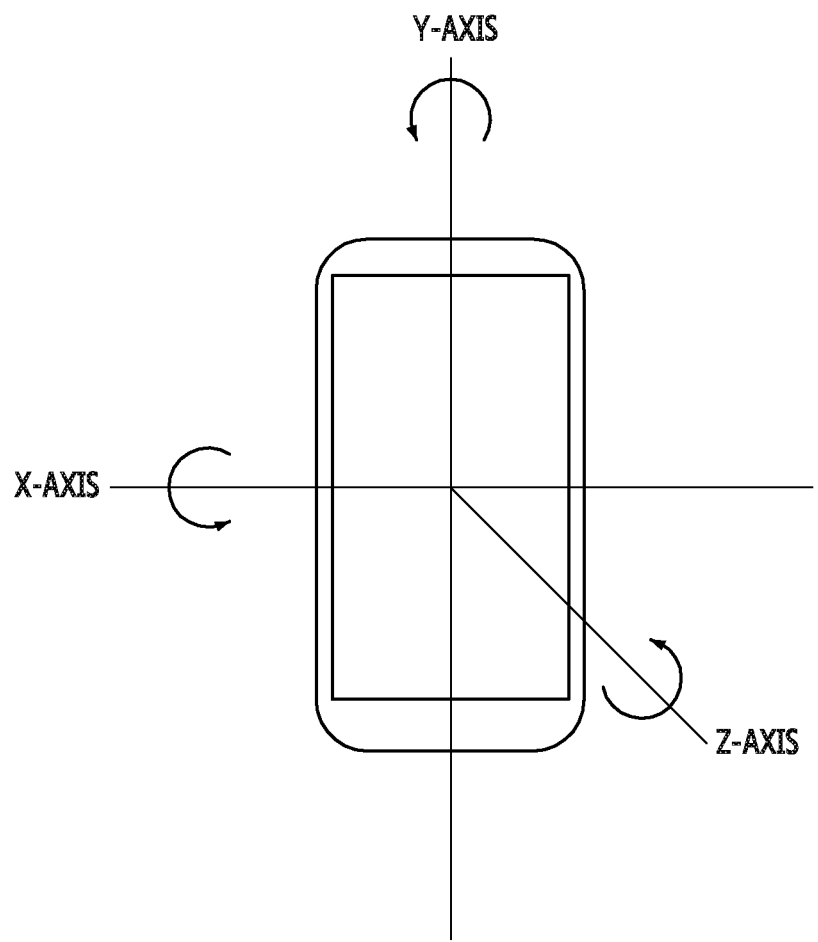

Combining the accelerometer, gyroscope and magnetometer data provides a reliable result in determining the orientation of the device 100. The X-axis determines the angle of rotation of the device 100 with respect to X position or horizontally, the Y-axis determines the angle of rotation with respect to Y position or vertically (as shown in the pictorial diagram of FIG. 7A illustrating X and Y axes rotation representations of the device 100), and the Z-axis determines the angle of rotation with respect to the north pole reading of the magnetometer 122 (as shown in the pictorial diagrams of FIGS. 7B and 7C illustrating Z-axis rotation representations of the device 100). Generally, the device 100 and the associated method consistent with the present disclosure may be arranged to determine the estimated area of damage, shock, or fracture received by the device 100 after incurring an impact from falling.

FIGS. 7A, 7B, and 7C are pictorial diagrams showing a multi-axis motion of the device of FIG. 1 according to various embodiments of the present disclosure.

At decision operation 602, if the magnitude resultant of the accelerometer, computed as $R=\sqrt{x^2+y^2+z^2}$ (wherein "R" may correspond to the impact vector information generated by executing the impact location determination procedure 116-a) is equal or close to zero ("0"), the impact monitoring process may be arranged to change the state of the device to "free fall." The reason for this condition is that the accelerometer's data are already inclusive of gravitational force and this force turns to zero ("0") if free fall is being experienced by the device 100. Otherwise, the impact monitoring process may move back to the previous operation 600 wherein the motion sensors 118, 120, 122 are monitored.

At operation 604, once it has been detected that the device 100 is undergoing free fall, the sensor data (i.e., the acceleration data, the angular rotation data, and the magnetic field data) may be stored, for example, in the memory module 108 until the device 100 has been stabilized. Alternatively, the sensor data may be stored in the respective memories of the accelerometer 118, gyroscope 120, and magnetometer 122 of the motion sensor system 104, if available.

At decision operation 606, to determine if the device 100 has stabilized or is in a stabilized state, the magnitude of accelerometer values may be checked, using the formula $R=\sqrt{x^2+y^2+z^2}$, and may be approximately equal to the force of acceleration induced by earth's gravity for 2 seconds. Otherwise, the impact monitoring process may move back to the previous operation 604. The accelerometer 118 at rest on the surface of the Earth may measure an acceleration of g=9.8 m/s$^2$. If the device 100 is at rest (i.e., facing up), the axes' values may be x=0, y=0, and z=9.8 m/s$^2$. With these values, the device 100 and the associated method consistent with the present disclosure may provide a resultant of $R=\sqrt{0^2+0^2+(9.8m/s^2)^2}=9.8$ m/s$^2$ which effectively corresponds to sensor fusion data. If the resultant "R" is approximately equal to the acceleration caused by the force of gravity, the device 100 and the associated method consistent with the disclosure may change the state of the same device 100 to the stabilized state.

At operation 608, the stored sensor data may be analyzed and any one or more changes in trends may be promptly recorded as and when the device 100 is detected to have changed from "free fall" state to "stable" state. Switching between these two states depends on the point in time when the device 100 experiences free fall and stabilization. Graphical representations of these analyses and trends may be represented on the display 110 of the device 100 upon user's request, and may also be exported into any suitable document of various file types which can be stored in any memory or transmitted to third-party server computer systems for later reading or consumption.

At decision operation 610, impact events may be searched throughout the stored sensor data or values and may be checked if the magnitude of the acceleration $R=\sqrt{x^2+y^2+z^2}$ is approximately equal or greater than 2g. Each impact point e., impact detection and/or determination) may be considered to have taken place after a period of free fall has occurred.

While no impact point is detected at the decision operation 610, the impact monitoring process may proceed to another decision operation 612 wherein the device 100 has reached the stable state. if the device 100 has reached the stable state, the impact monitoring process may move back to the previous operation 600 wherein the motion sensors 118-a, 120-a, 122-a are monitored. Otherwise, while the device 100 is not reaching the stable state, the process may move back to the previous operation 608 wherein the sensor data from free fall to stable state are analyzed. As it now becomes apparent, there may be a loop formed at least between the operation 608 and the decision operation 612 while no impact point is detected and while the device 100 is not yet reaching the stable state.

By utilizing all the data from the accelerometer, gyroscope and magnetometer sensors 118-a, 120-a, 122-a, the actual orientation of the device 100 can be derived, as shown in operation 614-a. This works by considering the relationships of the motion sensors 118-a, 120-a, 122-a, or more specifically the sensor data relative to one another and as well as the environment around the motion sensor system 104 and the device 100. Given the gravity vector provided by the accelerometer 118 and the magnetic north, i.e., in accordance with the magnetic field signals, pointed to by the magnetometer 122, the orientation of the device 100 can be determined and/or approximated.

The accuracy of this orientation determination can be improved by integrating the angular rotation over time signals determined by the gyroscope 120, as shown in operation 614-c and factoring this into the equation or any another suitable mathematical methods which are well known in the art. By comparing and filtering the data from the three motion sensors 118-a, 120-a, 122-a, calculation errors may be minimized and the actual orientation of the device 100 can be correctly and precisely determined. Sample accelerometer data (i.e., one of the impact parameter information) and computer-generated resultant data (i.e., the impact vector information for comparison with any predetermined threshold impact vector information) on the three-dimension axes, X, Y and Z, are presented in the graphical diagrams of FIGS. 8A and 8B, respectively, in accordance with various embodiments of the present disclosure.

Figure 8A:
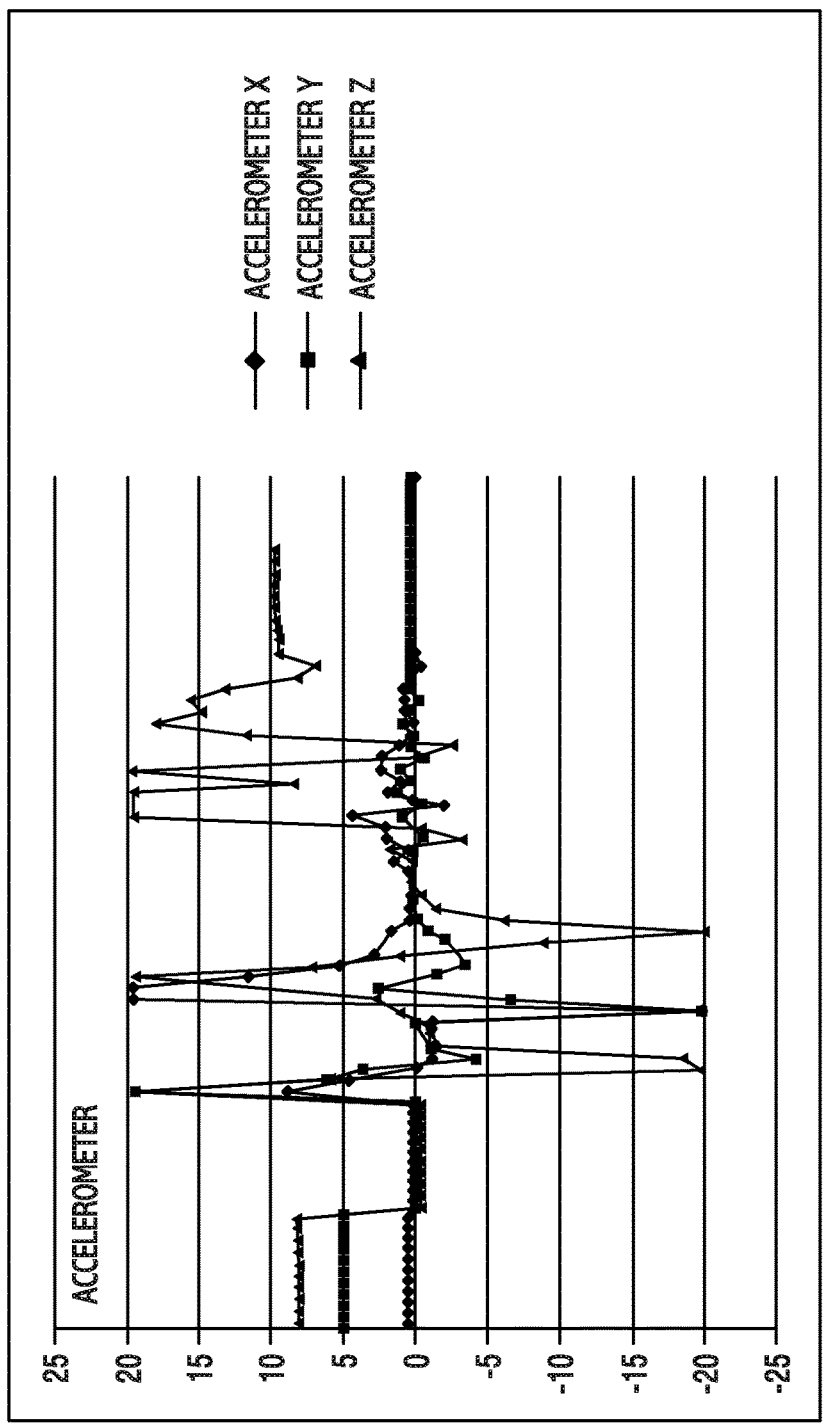
FIGS. 8A and 8B are graphical diagrams of sample accelerometer data and sample resultant data according to various embodiments of the present disclosure.
Figure 8B:
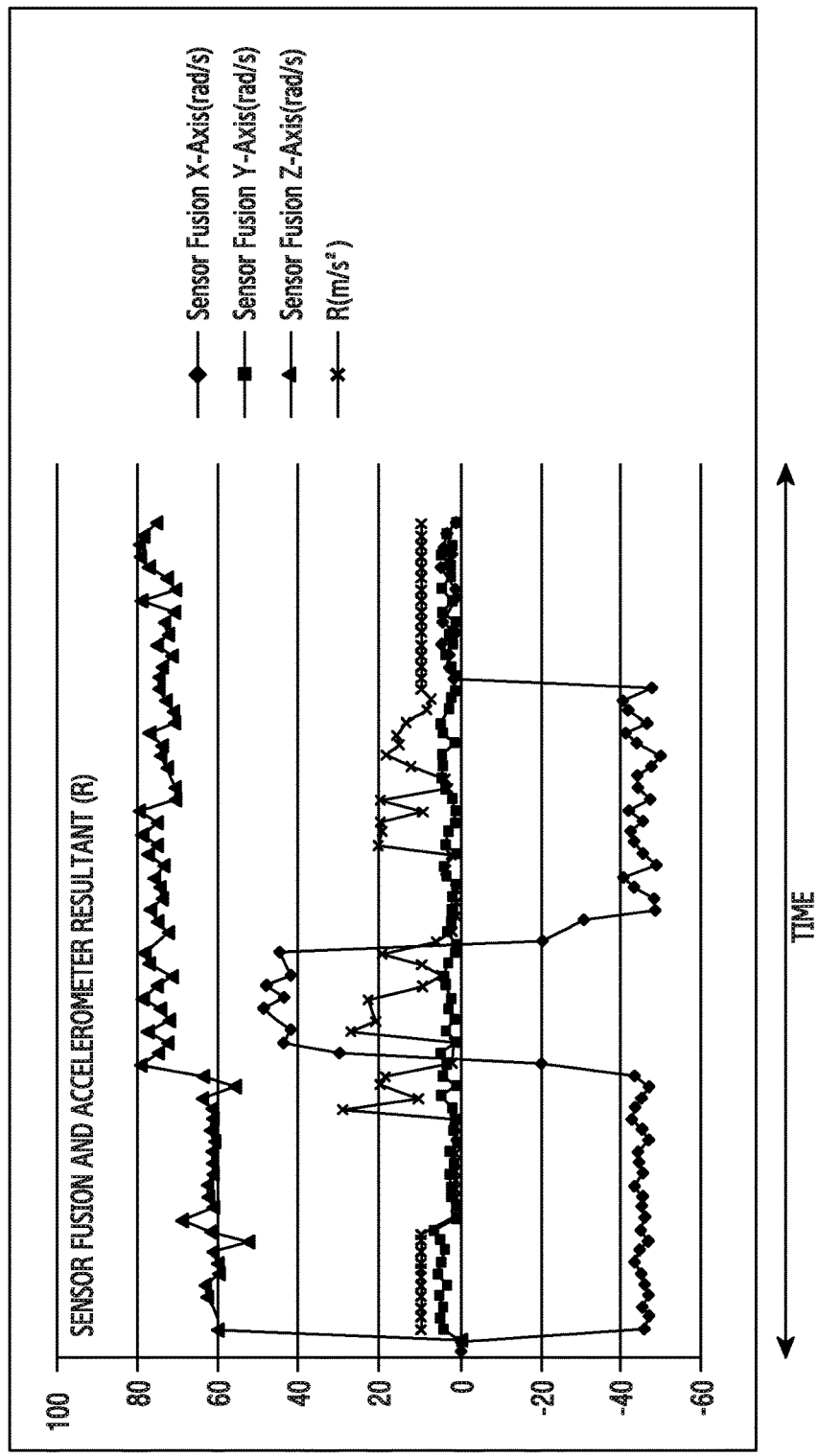

FIGS. 8A and 8B are graphical diagrams of sample accelerometer data and sample resultant data according to various embodiments of the present disclosure.

The determinations of the impact occurrence (i.e., as indicated by the impact point) at the decision operation 610, the device orientation at the operation 614-a, and angular velocity at the operation 614-c may cause the process to progress to operation 616 wherein location of the impact on the device 100 is determined and/or approximated, wherein the impact location is indicative of affected, damaged, shocked, or fractured area. In estimating or approximating the impact location, adjacent impact points may be compared. The estimated damaged area may be determined using initial position to next position and the initial angular velocity value to next angular velocity value associated with the motion of the device 100. All the impact points may be stored by the device 100 and the associated method consistent with the present disclosure and these points may be compared with one another to determine the rotation of the device 100.

Figure 9:
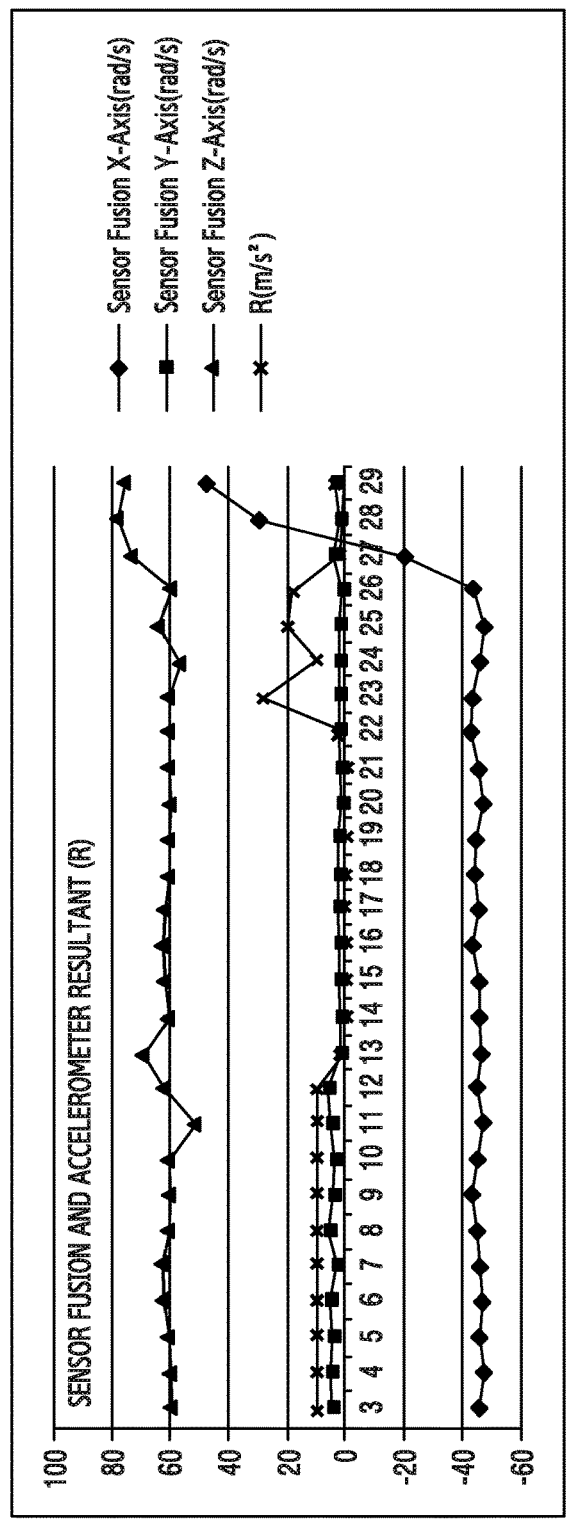
FIG. 9 is a graphical diagram of sample sensor fusion data and accelerometer data according to an embodiment of the present disclosure.

FIG. 9 is a graphical diagram of sample sensor fusion data and accelerometer data according to an embodiment of the present disclosure.

Figure 10A:
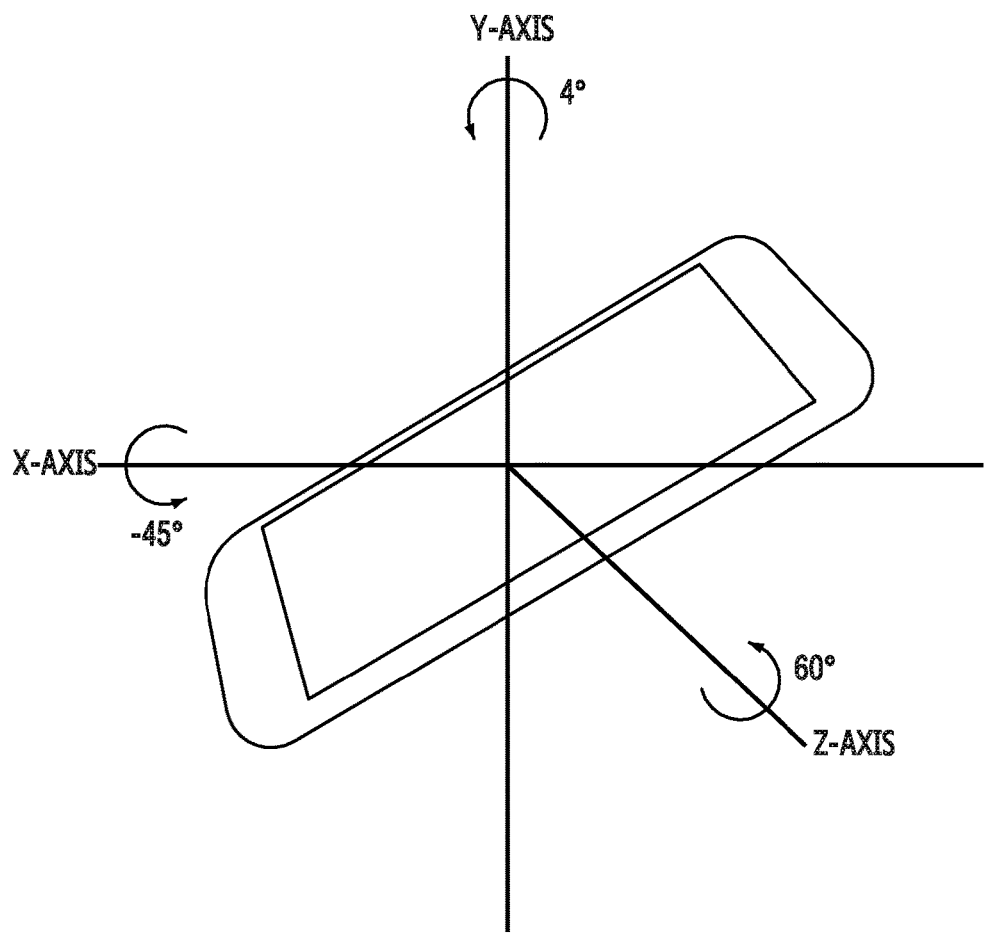
FIGS. 10A and 10B are pictorial diagrams showing a representative motion of the device of FIG. 1 in accordance with the graphical diagram of FIG. 9 according to various embodiments of the present disclosure.
Figure 10B:
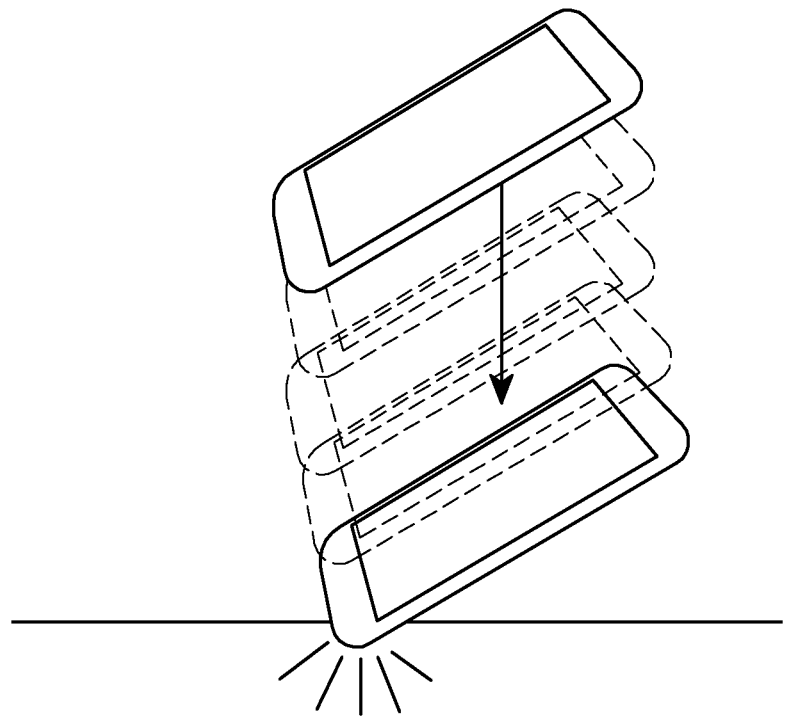

FIGS. 10A and 10B are pictorial diagrams showing a representative motion of the device of FIG. 1 in accordance with the graphical diagram of FIG. 9 according to various embodiments of the present disclosure.

Based on time 3-12 of the graphical diagram of FIG. 9, the device 100 is depicted to be at rest and tilted. At time 13-22, the device 100 is depicted to be experiencing free fall because the impact vector information "R" is approximately zero ("0"). At time 23-26, the impact vector information ("R") is depicted to have exceeded the value of the threshold impact vector information (T=2g). As a result, the device 100 may experience an impact which may cause shock, damage or fracture on its external and/or internal parts. The device 100 and the associated method consistent with the disclosure may be arranged to record the current orientation, as depicted by the graphical diagram of FIG. 9 and pictorial diagrams of FIGS. 10A and 10B. The disclosure may then assume and/or approximate that the impact location indicative of the damaged area is the part of the device 100 that is nearest to the ground.

At time 27-29, the device 100 is depicted to have experienced a free fall again. During this time (i.e., 27-29), the orientation changes as depicted in the graphical diagrams of FIGS. 9 and 11. If the impact location indicative of the shocked, damaged or fractured area increases its height, i.e., relative to the ground, the device 100 and the associated method consistent with the present disclosure may be arranged to confirm that the previous assumption and/or approximation is correct. Otherwise, the impact location indicative of the shocked, damaged or fractured area may be on the opposite side of the device 100.

Figure 11:
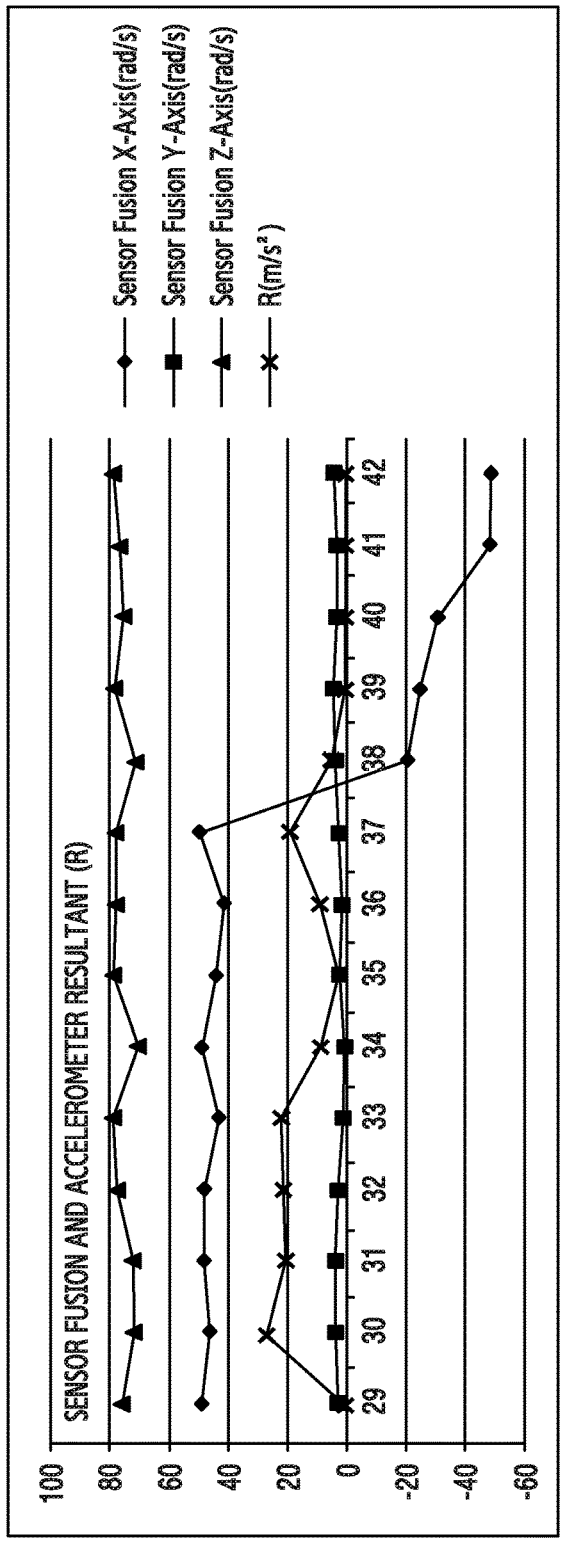
FIG. 11 is a graphical diagram of another sample sensor fusion data and accelerometer data according to an embodiment of the present disclosure.

FIG. 11 is a graphical diagram of another sample sensor fusion data and accelerometer data according to an embodiment of the present disclosure.

Figure 12A:
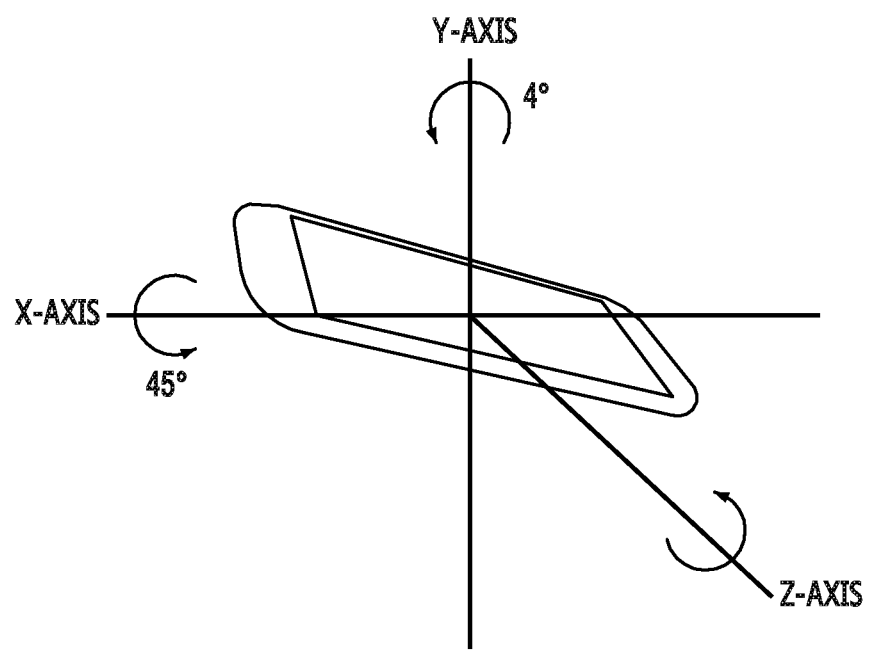
FIGS. 12A and 12B are pictorial diagrams showing another representative motion of the device of FIG. 1 in accordance with the graphical diagram of FIG. 11 according to various embodiments of the present disclosure.
Figure 12B:
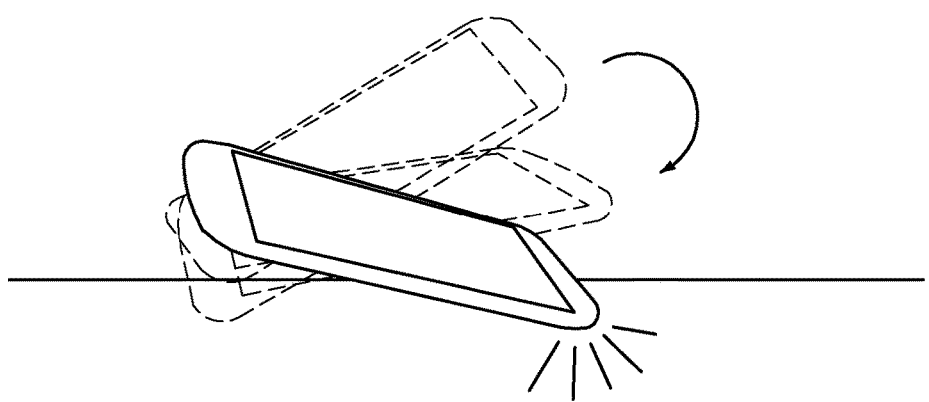

FIGS. 12A and 12B are pictorial diagrams showing another representative motion of the device of FIG. 1 in accordance with the graphical diagram of FIG. 11 according to various embodiments of the present disclosure.

Figure 13:
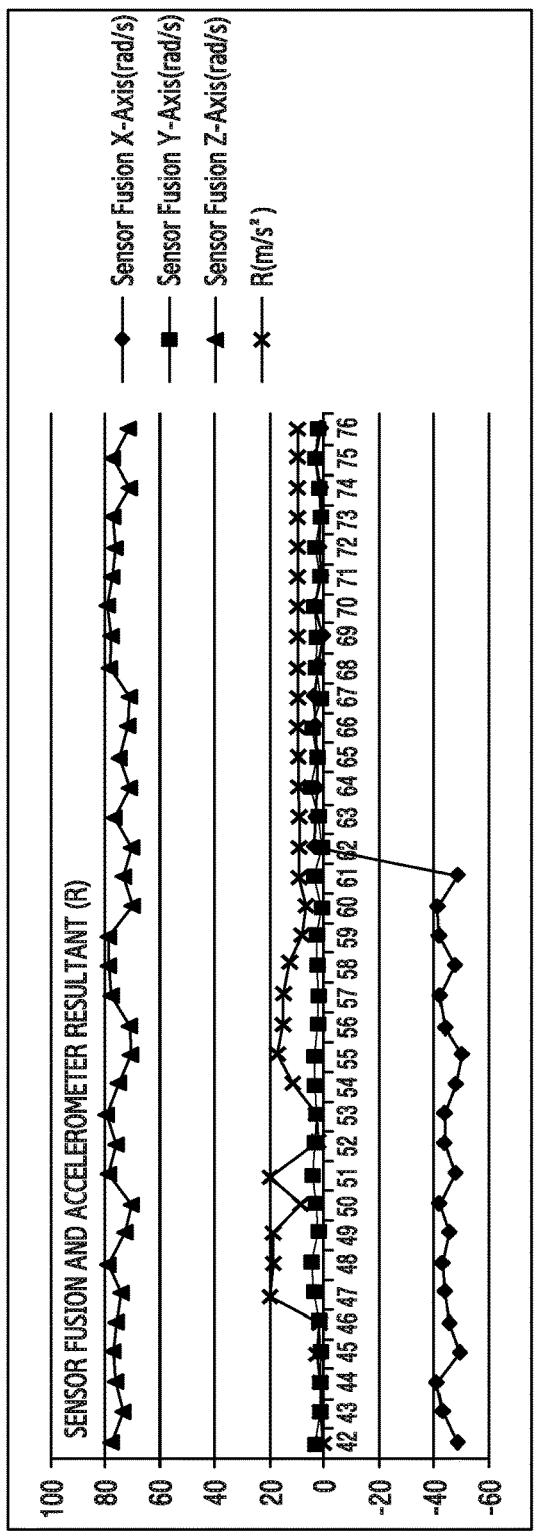
FIG. 13 is a graphical diagram of yet another sample sensor fusion data and accelerometer data according to an embodiment of the present disclosure.

FIG. 13 is a graphical diagram of yet another sample sensor fusion data and accelerometer data according to an embodiment of the present disclosure.

Based on the time 30-38 as presented in the graphical diagram of FIG. 11, the device 100 is depicted to have experienced an impact once again and is consequently tilted presented in the pictorial diagrams of FIGS. 12A and 12B. Afterwards, the device 100 is depicted to have experienced a free fall during time 39-42. During this time, i.e., 39-42, the device 100 is depicted to have experienced once again a change in orientation. Consequently, the device 100 and the associated method consistent with present disclosure may assume and/or approximate a new impact location indicative of the shocked, damaged or fractured area, which, again, may be the part of the device 100 that is nearest to the ground. This assumption and/or approximation may then be confirmed since at time 42-61 as presented in the graphical diagram of FIG. 13, the impact location indicative of the shocked, damaged or fractured area is depicted to have risen up.

Based on time 42-61 as presented in the graphical diagram of FIG. 13, the device 100 is depicted to have experienced damage causing impact since the impact vector information ("R") is depicted to have exceeded the threshold impact vector information. The device 100 and the associated method consistent with the present disclosure may assume that the impact location indicative of the shocked, damaged or fractured area is the part of the device 100 that is nearest to the ground. At time 62-76 the device 100 is depicted to be at rest as presented in the pictorial diagram of FIGS. 14A and 14B.

Figure 14A:
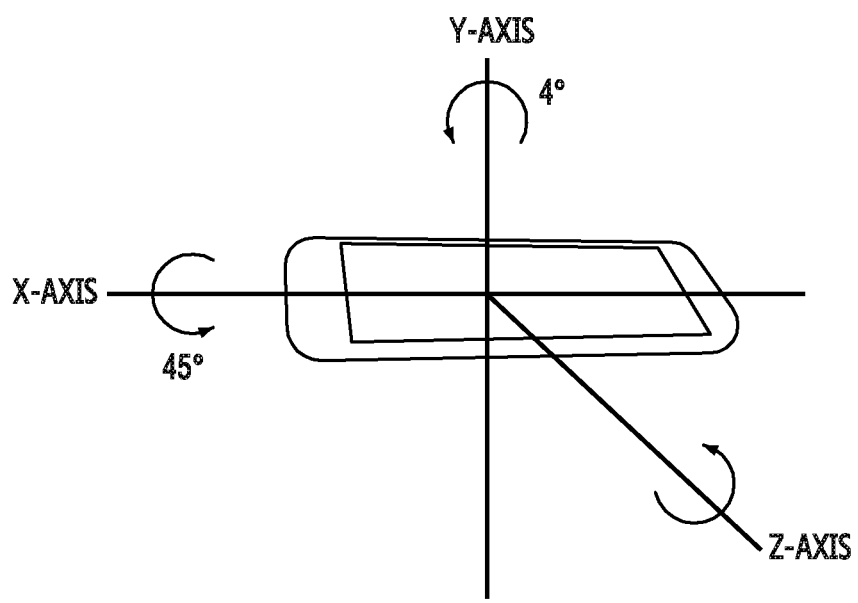
FIGS. 14A and 14B are pictorial diagrams showing yet another representative motion of the device of FIG. 1 in accordance with the graphical diagram of FIG. 13 according to various embodiments of the present disclosure.
Figure 14B:
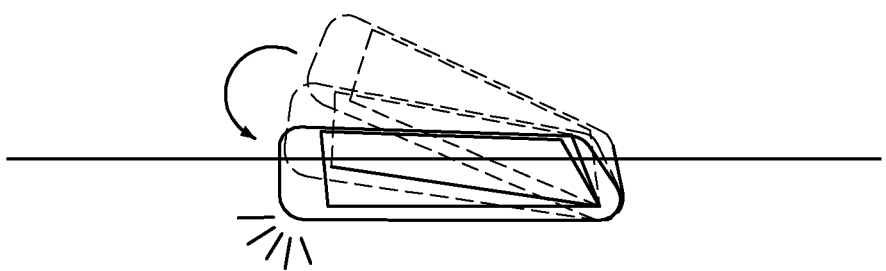

FIGS. 14A and 14B are pictorial diagrams showing yet another representative motion of the device of FIG. 1 in accordance with the graphical diagram of FIG. 13 according to various embodiments of the present disclosure.

At operation 618, the derived, estimated and/or approximated impact location indicative of the shocked, damaged or fractured area may be updated by incrementing the impact count in the respective shocked, damaged or fractured area for the total damage severity estimation and/or approximation.

Figure 15:
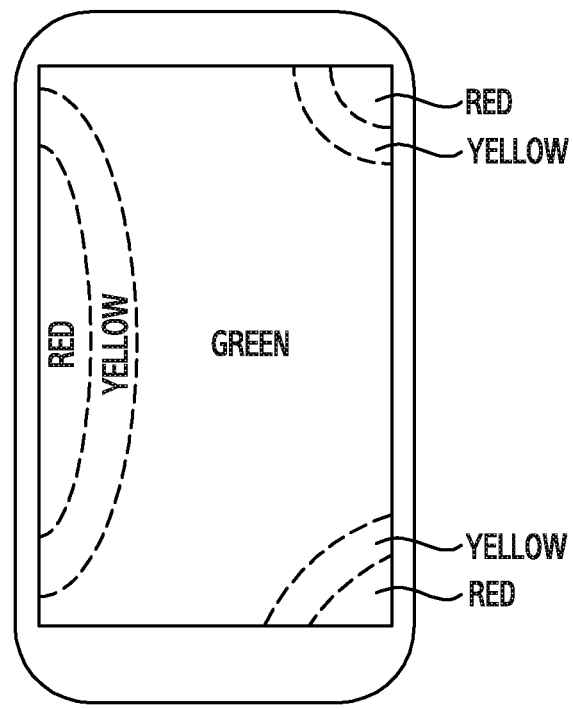
FIG. 15 is a pictorial diagram of a display of the device of FIG. 1 showing a preferred user interface made according to an embodiment of the present disclosure.

FIG. 15 illustrates a pictorial diagram of a display of the device of FIG. 1 showing a preferred user interface made according to an embodiment of the present disclosure.

As now presented in the pictorial diagram of FIG. 15, the colored light pattern corresponding to the impact indicator displayable on the display, or the display unit 110, of the device 100 may include colors representative of gradients of green, yellow and red depicted in increasing severity. For example, the red color may represent a "severe impact" event, the yellow color may represent a "moderate impact" event, and the green color may represent a "no impact" event. The green to red gradient is preferably used to represent low to high degree or severity of impact (i.e., from "no impact" event to "severe impact" event) on various approximated locations of impact on the device 100. In essence, the impact indicator serves as a preview of impact events.

In particular, the colored light pattern on the display 110 may start as green, indicating that the device 100 is in full health and that no damage-causing impact is recorded by the disclosure yet. Meanwhile, areas that have yellow light pattern on the display 110 may indicate that the corresponding part or hardware portion of the device 100 has taken light or a few instances or count of impact which, in turn, may be indicative of a possibility of slight to moderate damage. Finally, areas that have red light pattern on the display 110 may indicate that the corresponding part or hardware portion of the device 100 has taken severe or repeated instances or count of impact which, in turn, may be indicate of a possibility of severe or irreparable damage.

With the visual representation of impacts incurred on the device 100, users can estimate the frequency and intensity of the times they drop or hit their devices. A screen of impact logs may be arranged in conjunction with the present disclosure to display the total number of all impact events incurred on the device 100 and to contain a list view of the dates and times of each impact event. These information, along with other pertinent impact-related information, may be arranged to be accessible to users from the display 110 displaying a damage monitoring interface through any command associated with a touch button, a key press, a widget, a gesture, a voice, a head-motion, biometric information, a digital signature, or any such other input and/or authentication mechanisms which are well known in the art. According to another embodiment, the display 110 may display a damage monitoring interface right after the free fall occurs. The display 110 may display a damage monitoring interface when the device 100 is determined to reach the stable state after the impact occurs.

FIGS. 16A, 16B, 16C, and 16D illustrate pictorial diagrams of a display of the device of FIG. 1 showing another preferred user interfaces made according to various embodiments of the present disclosure.

Figure 16A:
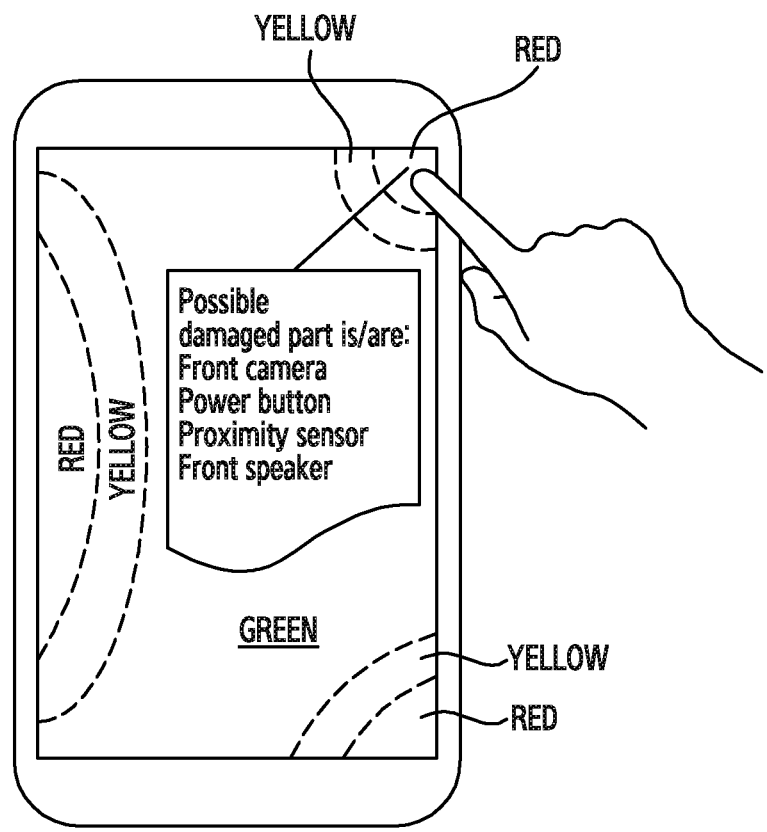
FIGS. 16A, 16B, 16C, and 16D are pictorial diagrams of a display of the device of FIG. 1 showing another preferred user interfaces made according to various embodiments of the present disclosure.
Figure 16B:
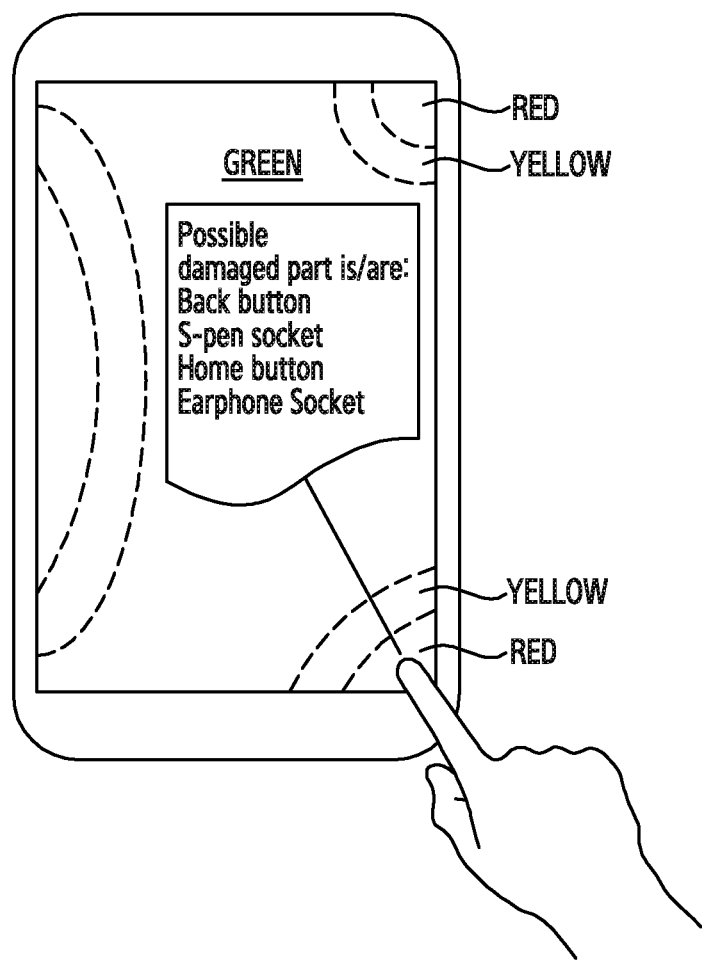
Figure 16C:
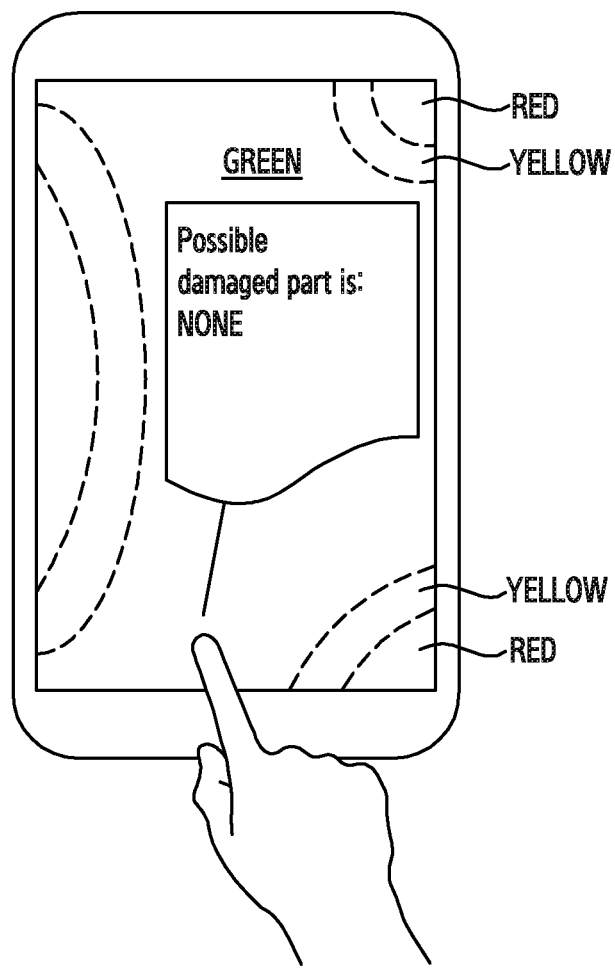
Figure 16D:
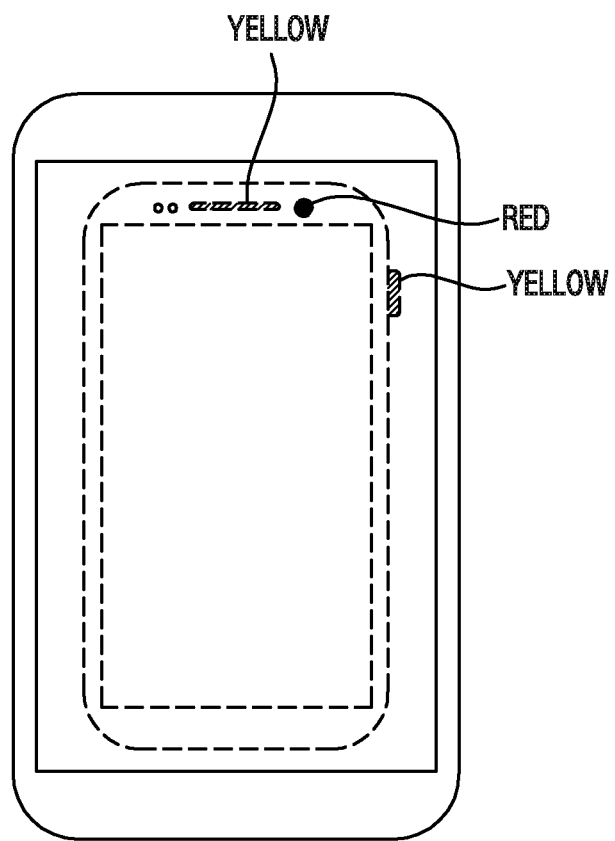

To aid diagnosis of the health of the device 100, an impact report screen may be arranged to display possible damages caused to internal and/or external hardware parts based on the impact events, as presented in the pictorial diagrams of FIGS. 16A, 16B, 16C, and 16D. A pop-up screen with the details of the report for a particular area may be arranged to be shown through different gestures on the area of impact locations represented by gradients of green, yellow and red with increasing impact severity. The hardware health or status of the device 100 may also be graphically or textually represented on the "about device" section of the "settings" menu on its display or interface 110. As illustrated in FIG. 16D, the device 100 may display possible damages caused to internal and/or external hardware parts on the display screen with different colors according to the impact severity. According to an embodiment, when a right-upper side of the device 100 has impacted, the device 100 may display internal/external hardwares possibly damaged by the impact (e.g., front camera, power button and front speaker) with different colors. Red color may represent 'serious' impact and yellow color may represent 'moderate' impact.

According to another embodiment of the present disclosure, the device 100 may perform self-verification on the internal/external hardwares which are expected to be damaged according to the estimated impact area. The self-verification may be performed through any command associated with a touch button, a key press, a widget, a gesture, a voice, a head-motion, biometric information, a digital signature, or any such other input and/or authentication mechanisms which are well known in the art. If the internal/external hardwares operate normally, it can be shown that the internal/external hardwares are OK through the display 110. If the internal/external hardwares operate abnormally, the internal/external hardwares which are damaged can be displayed through the display 110 or a warning message to visit a service center to check the hardwares more precisely can be displayed.

Figure 17:
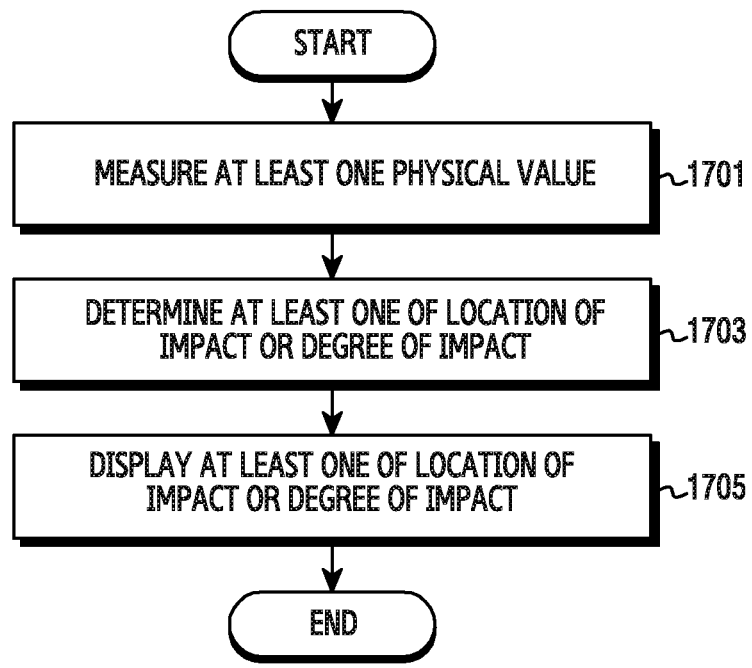
FIG. 17 is a flow diagram of a method for representing an impact event on an electronic device according to an embodiment of the present disclosure.

FIG. 17 is a flow diagram of a method for representing an impact event on an electronic device according to an embodiment of the present disclosure. For example, the electronic device may comprise the device 100 of FIG. 1.

Referring to FIG. 17, at operation 1701, the device 100 measures at least one physical value corresponding to a movement of the device 100, using at least one sensor. For example, at least one sensor may comprise at least one of an accelerometer sensor, a gyroscope sensor and a magnetometer. At least one physical value may comprise at least one of an acceleration value, a rotation value or a magnetic field value. According to an embodiment of the present disclosure, at least one physical value may comprise at least one quantitative parameter calculated based on at least one of the accelerometer sensor data, the gyroscope sensor data and the magnetometer sensor data.

At operation 1703, in response to detecting an impact occurred on the device 100, the device 100 determines at least one of a location of the impact on the device 100 or a degree of the impact, based on the at least one physical value. According to an embodiment of the present disclosure, the device 100 may determine whether the impact is occurred on the device 100 by comparing the at least one physical value with a predetermined threshold. The predetermined threshold may be twice the gravitational acceleration (2g). According to another embodiment of the present disclosure, the device 100 may determine an orientation of the electronic device by analyzing the at least one physical value. The device 100 may determine the location of the impact based on the determined orientation. Then, the device 100 may determine the degree of the impact and an area of the impact on the electronic device, based on the at least one physical value and a distance from the location of impact.

At operation 1705, the device 100 displays at least one of the location of the impact or the degree of the impact. According to an embodiment of the present disclosure, the device 100 the device 100 may display the location of the impact and the degree of the impact through the display 110. According to another embodiment of the present disclosure, the device 100 may display estimated information indicative of at least one impact-affected physical component of the device 100, based on the location of the impact and the degree of the impact. The device 100 may display the location of the impact on the device 100 with a color indicator and the color indicator may comprise a color that is different according to the degree of the impact. The color indicator may comprise a light pattern projected by a light source operatively coupled to the display 110, and the light pattern may be adapted to change in color according to the degree of the impact.

It is to be understood and appreciated that the herein described modules are merely presented in segregated format based on their intended functions for the sake of illustrating how they are relevant to implementations and/or embodiments of the device and associated method of the present disclosure. The herein described modules are merely illustrative and can be fewer or greater in number, as it is well known in the art of computing that such program codes representing various functions of different modules can be combined or segregated in any suitable but efficient manner insofar as software execution is concerned.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for representing an impact event, the electronic device comprising:

at least one sensor;
a display; and
at least one processor configured to:
- measure at least one physical value corresponding to a movement of the electronic device using the at least one sensor,
- in response to detecting that an impact has occurred on the electronic device, determine, based on the at least one physical value, an orientation of the electronic device,
- determine, based on the orientation of the electronic device, a point of the impact on the electronic device and a degree of the impact,
- control the display to graphically display the point of the impact and the degree of the impact, and
- control the display to display an image on the electronic device including portions indicative of one or more impact-affected physical components of the electronic device, wherein the portions respectively are displayed by colors which are determined according to the degree of the impact.

2. The electronic device of claim 1, wherein the at least one processor is further configured to determine whether the impact has occurred on the electronic device by comparing the at least one physical value with a predetermined threshold.

3. The electronic device of claim 1, wherein the at least one processor is further configured to:
- determine the point of the impact based on the determined orientation; and
- determine the degree of the impact and an area of the impact on the electronic device, based on the at least one physical value and a distance from the point of the impact.

4. The electronic device of claim 1, wherein the at least one sensor comprises at least one of an accelerometer sensor, a gyroscope sensor, or a magnetometer.

5. The electronic device of claim 4, wherein the at least one physical value comprises at least one of an acceleration value, a rotation value, or a magnetic field value.

6. The electronic device of claim 1,
wherein the at least one processor is further configured to display one or more color indicators which vary according to a count of an occurrence of one or more impacts, and
wherein areas of the display at which the one or more color indicators are respectively correspond to one or more points at which the one or more impacts have occurred.

7. The electronic device of claim 1, wherein the at least one processor is further configured to:
- control the display to display, based on the degree of the impact, a color light pattern, and
- in response to detecting an input for selecting a portion of the color light pattern, control the display to display information on one or more impact-affected physical components of the electronic device, the one or more impact-affected physical components having been damaged by one or more impacts which have occurred on the portion.

8. The electronic device of claim 1, wherein the at least one processor is further configured to generate a quantitative metric related to the impact.

9. A method for representing an impact event on an electronic device, the method comprising:
- measuring at least one physical value corresponding to a movement of the electronic device, using at least one sensor;
- in response to detecting that an impact has occurred on the electronic device, determining, based on the at least one physical value, an orientation of the electronic device;
- determining, based on the orientation of the electronic device, a point of the impact on the electronic device and a degree of the impact; and
- graphically displaying the point of the impact and the degree of the impact using a display of the electronic device, wherein the displaying of the point of the impact and the degree of the impact comprises displaying an image on the electronic device including portions indicative of at least one impact-affected physical component of the electronic device based on the point of the impact and the degree of the impact, and
wherein the portions respectively are displayed by colors which are determined according to the degree of the impact.

10. The method of claim 9, wherein the detecting of the impact comprises determining whether the impact has occurred on the electronic device by comparing the at least one physical value with a predetermined threshold.

11. The method of claim 9, wherein the determining of the point of the impact and the degree of the impact comprises:
- determining the point of the impact based on the determined orientation; and
- determining the degree of the impact and an area of the impact on the electronic device, based on the at least one physical value and a distance from the point of the impact.

12. The method of claim 9,
wherein the displaying of the point of the impact and the degree of the impact comprises displaying one or more color indicators which vary according to a count of an occurrence of one or more impacts, and
wherein areas of the display at which the one or more color indicators are respectively correspond to one or more points at which the one or more impacts have occurred.

13. The method of claim 9, further comprising:
- displaying, based on the degree of the impact, a color light pattern; and
- in response to detecting an input for selecting a portion of the color light pattern, displaying information on one or more impact-affected physical components of the electronic device, the one or more impact-affected physical components having been damaged by one or more impacts which have occurred on the portion.

14. A non-transitory computer-readable medium comprising computer executable instructions that when executed by a processor of an electronic device cause the processor to effectuate a method comprising:
- measuring at least one physical value corresponding to a movement of the electronic device, using at least one sensor;
- in response to detecting that an impact has occurred on the electronic device, determining, based on the at least one physical value, an orientation of the electronic device;
- determining, based on the orientation of the electronic device, a point of the impact on the electronic device and a degree of the impact; and
- graphically displaying the point of the impact and the degree of the impact using a display of the electronic device, wherein the displaying of the point of the impact and the degree of the impact comprises displaying an image on the electronic device including portions indicative of at least one impact-affected physical component of the electronic device based on the point of the impact and the degree of the impact, and wherein the portions respectively are displayed by colors which are determined according to the degree of the impact.

15. The non-transitory computer-readable medium of claim 14, wherein the detecting of the impact comprises determining whether the impact has occurred on the electronic device by comparing the at least one physical value with a predetermined threshold.

16. The electronic device of claim 8, wherein the quantitative metric comprises a quantity of impacts that have occurred on the point of the impact.

17. The electronic device of claim 8, wherein the quantitative metric comprises a quantity of impacts that have occurred at points neighboring the point of the impact.

18. The electronic device of claim 8, wherein the quantitative metric comprises a quantity of impacts that have occurred at different points on the electronic device in accordance with one of a predefined area or a perimeter of the electronic device.

* * * * *